US008218168B2

(12) United States Patent
Iwata

(10) Patent No.: US 8,218,168 B2
(45) Date of Patent: Jul. 10, 2012

(54) IMAGE FORMING APPARATUS AND INFORMATION PROCESSING METHOD

(75) Inventor: Yumiko Iwata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 657 days.

(21) Appl. No.: 12/396,985

(22) Filed: Mar. 3, 2009

(65) Prior Publication Data

US 2009/0219572 A1 Sep. 3, 2009

(30) Foreign Application Priority Data

Mar. 3, 2008 (JP) ................................. 2008-052088

(51) Int. Cl.
*G06K 15/00* (2006.01)
*G06F 3/12* (2006.01)
*G06F 15/173* (2006.01)

(52) U.S. Cl. ..................... 358/1.14; 358/1.15; 358/1.16; 358/1.17; 358/1.13; 709/239

(58) Field of Classification Search ........................ None
See application file for complete search history.

(56) References Cited

U.S. PATENT DOCUMENTS

| | | | | |
|---|---|---|---|---|
| 7,884,959 | B2 * | 2/2011 | Randt | 358/1.15 |
| 2002/0009302 | A1 * | 1/2002 | Kodama et al. | 399/18 |
| 2006/0291871 | A1 * | 12/2006 | Yamaguchi et al. | 399/8 |
| 2008/0224387 | A1 * | 9/2008 | Tamagaki | 271/227 |
| 2009/0309912 | A1 * | 12/2009 | Kusuhata | 347/16 |
| 2010/0278578 | A1 * | 11/2010 | Yamada | 400/582 |

FOREIGN PATENT DOCUMENTS

| | | |
|---|---|---|
| JP | 05-270622 | 10/1993 |
| JP | 11-091217 | 4/1999 |

* cited by examiner

*Primary Examiner* — Satwant Singh
(74) *Attorney, Agent, or Firm* — Canon USA Inc IP Division

(57) ABSTRACT

An image forming apparatus includes a storage unit configured to store attribute information about a job executed on the image forming apparatus, a detection unit configured to detect a jam that has occurred on the image forming apparatus, and a generation unit configured to generate a test job in which a print setting is set based on a type of the jam detected by the detection unit and the job attribute information corresponding to the jam and stored on the storage unit.

14 Claims, 31 Drawing Sheets

FIG. 5

JAM CODE LIST

501

| OCCURRENCE SEGMENT (502) | JAM TYPE (503) | JAM LOCATION (504) | JAM DETAILED DESCRIPTION (505) |
|---|---|---|---|
| 00 | 01 | 01 | PAPER FEED CASSETTE 114 DELAY JAM |
| 00 | 01 | 02 | PAPER FEED CASSETTE 115 DELAY JAM |
| 00 | 01 | 04 | REGISTRATION ROLLER DELAY JAM |
| 00 | : | : | |
| 01 | 01 | 05 | FIXING UNIT ENTRANCE DELAY JAM |
| 01 | 01 | 06 | FIXING UNIT CONVEYANCE DELAY JAM |
| 01 | : | 07 | FIXING UNIT PAPER DISCHARGE DELAY JAM |
| 01 | | 0A | TWO-SIDED REGISTRATION ROLLER DELAY JAM |
| 01 | | 0B | TWO-SIDED PAPER FEED ROLLER DELAY JAM |
| 01 | | 0C | DECK PAPER FEED ROLLER DELAY JAM |
| 01 | | 0D | DECK CONVEYANCE ROLLER DELAY JAM |
| 01 | | 11 | REVERSE ROLLER EXIT DELAY JAM |
| : | : | : | |
| 02 | 11 | 86 | SADDLE STITCHER STAPLER STAPLE JAM |
| 02 | 11 | A1 | SADDLE STITCHER CONVEYANCE PATH SENSOR CONGESTION JAM |
| 02 | 11 | A2 | SADDLE STITCHER FOLDING PATH SENSOR CONGESTION JAM |

FIG. 6A

PRINT SETTING CONDITION TABLE
(OCCURRENCE SEGMENT: PAPER FEED UNIT 00)

602 603 601

| JAM OCCURRENCE LOCATION | PRINT SETTING | | | | |
|---|---|---|---|---|---|
| | PAPER FEED UNIT | TWO-SIDED/ ONE-SIDED | FINISHING/ PAPER DISCHARGE METHOD | PAPER DISCHARGE DESTINATION | STAPLING |
| PAPER FEED CASSETTE 114 (01) | JOB SETTING VALUE | DEFAULT | DEFAULT | DEFAULT | DEFAULT |
| PAPER FEED CASSETTE 115 (02) | JOB SETTING VALUE | DEFAULT | DEFAULT | DEFAULT | DEFAULT |
| REGISTRATION ROLLER (04) | DEFAULT | DEFAULT | DEFAULT | DEFAULT | DEFAULT |

FIG. 6B

PRINT SETTING CONDITION TABLE
(OCCURRENCE SEGMENT: APPARATUS BODY 01)

612 613 611

| JAM OCCURRENCE LOCATION | PRINT SETTING | | | | |
|---|---|---|---|---|---|
| | PAPER FEED UNIT | TWO-SIDED/ ONE-SIDED | FINISHING/ PAPER DISCHARGE METHOD | PAPER DISCHARGE DESTINATION | STAPLING |
| PAPER SEPARATION ROLLER (02) | DEFAULT | DEFAULT | DEFAULT | DEFAULT | DEFAULT |
| PAPER FEED UNIT (03) | DEFAULT | DEFAULT | DEFAULT | DEFAULT | DEFAULT |
| FIXING DEVICE ENTRANCE (05) | DEFAULT | DEFAULT | DEFAULT | DEFAULT | DEFAULT |
| FIXING DEVICE SHEET CONVEYANCE PORTION (06) | DEFAULT | DEFAULT | DEFAULT | DEFAULT | DEFAULT |
| FIXING DEVICE PAPER DISCHARGE ROLLER (07) | DEFAULT | DEFAULT | DEFAULT | DEFAULT | DEFAULT |
| REVERSING UNIT EXIT (11) | DEFAULT | JOB SETTING VALUE | DEFAULT | DEFAULT | DEFAULT |
| PAPER DISCHARGE UNIT (41) | DEFAULT | DEFAULT | DEFAULT | DEFAULT | DEFAULT |
| REVERSING UNIT REGISTRATION ROLLER (43) | DEFAULT | JOB SETTING VALUE | DEFAULT | DEFAULT | DEFAULT |
| DISCHARGE ROLLER SENSOR (46) | DEFAULT | DEFAULT | DEFAULT | DEFAULT | DEFAULT |
| REVERSING UNIT DISCHARGE ROLLER (80) | DEFAULT | JOB SETTING VALUE | DEFAULT | DEFAULT | DEFAULT |

FIG. 6C

PRINT SETTING CONDITION TABLE
(OCCURRENCE SEGMENT: FINISHER 02)

622 623 621

| JAM OCCURRENCE LOCATION | PRINT SETTING | | | | |
|---|---|---|---|---|---|
| | PAPER FEED UNIT | TWO-SIDED/ ONE-SIDED | FINISHING/ PAPER DISCHARGE METHOD | PAPER DISCHARGE DESTINATION | STAPLING |
| STAPLER STAPLE (01) | DEFAULT | JOB SETTING VALUE | JOB SETTING VALUE | JOB SETTING VALUE | JOB SETTING VALUE |
| PAPER DISCHARGE PATH (21) | DEFAULT | JOB SETTING VALUE | DEFAULT | JOB SETTING VALUE | JOB SETTING VALUE |
| STAPLING TRAY (25) | DEFAULT | JOB SETTING VALUE | JOB SETTING VALUE | JOB SETTING VALUE | JOB SETTING VALUE |
| SADDLE STITCHER STAPLER STAPLE (86) | DEFAULT | JOB SETTING VALUE | JOB SETTING VALUE | JOB SETTING VALUE | JOB SETTING VALUE |
| SADDLE STITCHER PAPER CONVEYANCE PATH (A1) | DEFAULT | JOB SETTING VALUE | JOB SETTING VALUE | JOB SETTING VALUE | JOB SETTING VALUE |
| SADDLE STITCHER FOLDING PATH (A2) | DEFAULT | DEFAULT | DEFAULT | DEFAULT | JOB SETTING VALUE |

FIG. 7

| ACQUIRED INFORMATION | | |
|---|---|---|
| OCCURRENCE DATE AND TIME | 2007/10/10 18:56 | 701 |
| JAM CODE | 0x0211A1 | 702 |
| PAPER SIZE | A4 | 703 |
| PAPER FEED PORT | CASSETTE 114 | 704 |
| TWO-SIDED/ONE-SIDED | TWO-SIDED | 705 |
| FINISHING/PAPER DISCHARGE METHOD | SORTING | 706 |
| PAPER DISCHARGE DESTINATION | TRAY A | 707 |
| STAPLING | NO | 708 |

FIG. 9

901 902 903 904

| OCCURRENCE DATE AND TIME | JAM CODE | TEST JOB PRINT SETTING | | | | |
|---|---|---|---|---|---|---|
| | | PAPER FEED PORT | TWO-SIDED/ ONE-SIDED | FINISHING/PAPER DISCHARGE METHOD | PAPER DISCHARGE DESTINATION | STAPLING |
| 2007/10/10 18:56 | 0x0211A1 | AUTO | TWO-SIDED | SORTING | TRAY A | NO |

FIG. 12

| | JAM 1 | JAM 2 | JAM 3 | |
|---|---|---|---|---|
| OCCURRENCE DATE AND TIME | 2007/10/10 18:56 | 2007/10/10 18:56 | 2007/10/10 18:56 | 1201 |
| TOTAL COUNTER | 21365 | 21365 | 21365 | 1202 |
| JAM CODE | 0x000101 | 0x000102 | 0x0211A1 | 1203 |
| PAPER SIZE | A4 | A3 | A4 | 1204 |
| PAPER FEED PORT | CASSETTE 114 | CASSETTE 115 | CASSETTE 114 | 1205 |
| TWO-SIDED/ONE-SIDED | TWO-SIDED | TWO-SIDED | TWO-SIDED | 1206 |
| FINISHING/PAPER DISCHARGE METHOD | SORTING | SORTING | SORTING | 1207 |
| PAPER DISCHARGE DESTINATION | TRAY A | TRAY A | TRAY A | 1208 |
| STAPLING | NO | NO | NO | 1209 |

FIG. 14

1401 1402 1403 1404

| OCCURRENCE DATE AND TIME | JAM CODE | TEST JOB PRINT SETTING | | | | |
|---|---|---|---|---|---|---|
| | | PAPER FEED PORT | TWO-SIDED/ ONE-SIDED | FINISHING/PAPER DISCHARGE METHOD | PAPER DISCHARGE DESTINATION | STAPLING |
| 2007/10/10 18:56 | 0x000101 | CASSETTE 114 | TWO-SIDED | SORTING | TRAY A | NO |
| | 0x000102 | CASSETTE 115 | TWO-SIDED | SORTING | TRAY A | NO |
| | 0x0211A1 | | | | | |

FIG. 20

| TRANSMISSION DATA | | 2001 |
|---|---|---|
| DEVICE ID | DEV00001 | 2002 |
| OCCURRENCE DATE AND TIME | 2007/10/10 18:56 | 2003 |
| TOTAL COUNTER | 92118 | 2004 |
| JAM CODE | 0x010107 | 2005 |
| PAPER SIZE | A4 | 2006 |
| PAPER FEED PORT | CASSETTE 1 | 2007 |
| TWO-SIDED/ONE-SIDED | TWO-SIDED | 2008 |
| FINISHING/PAPER DISCHARGE METHOD | SORTING | 2009 |
| PAPER DISCHARGE DESTINATION | TRAY A | 2010 |
| STAPLING | NO | 2011 |

FIG. 21

2102 2103 2101 2104 2105

SETTING-CONCERNED COMPONENT CORRESPONDENCE TABLE

| MAIN BODY SEGMENT | SETTING | COMPONENT NAME | COMPONENT POSITION MARKER |
|---|---|---|---|
| PAPER FEED UNIT (JAM OCCURRENCE SEGMENT:00, 01, 02) | SET FOR ALL | PAPER FEED AND CONVEYANCE ROLLER 1 | 1. 00. 001 |
| | | REGISTRATION ROLLER | 1. 00. 002 |
| | CASSETTE 114 | CASSETTE 114 PAPER FEED ROLLER | 1. 01. 001 |
| | | CASSETTE 114 PAPER CONVEYANCE ROLLER | 1. 01. 002 |
| | CASSETTE 115 | CASSETTE 115 PAPER FEED ROLLER | ... |
| | | CASSETTE 115 PAPER CONVEYANCE ROLLER | ... |
| | | CASSETTE 114 PAPER CONVEYANCE ROLLER | ... |
| | MANUAL FEED TRAY | DECK PAPER FEED ROLLER | ... |
| | | DECK PAPER CONVEYANCE ROLLER | ... |
| TRANSFER UNIT (JAM OCCURRENCE SEGMENT:01, 02) | SET FOR ALL | PHOTOSENSITIVE DRUM | 2. 00. 001 |
| | | TRANSFER BELT | 2. 00. 002 |
| | | SEPARATION CLAW | 2. 00. 003 |
| | TWO-SIDED PRINTING | TWO-SIDED PAPER FEED ROLLER | 2. 01. 001 |
| | | TWO-SIDED REGISTRATION ROLLER | 2. 01. 002 |
| FIXING UNIT (JAM OCCURRENCE SEGMENT:01, 02) | SET FOR ALL | FIXING UNIT PAPER FEED ROLLER | ... |
| | | FIXING UNIT PAPER DISCHARGE ROLLER | ... |
| | ... | ... | ... |
| ... | ... | ... | ... |
| PAPER DISCHARGE UNIT (JAM OCCURRENCE SEGMENT:02) | ... | ... | ... |

FIG. 22

2201 COMPONENT CONSUMPTION RATE

| MAIN BODY COMPONENT (2202) | SETTING (2203) | COMPONENT NAME (2204) | COMPONENT POSITION MARKER (2205) | CONSUMPTION RATE [%] (2206) |
|---|---|---|---|---|
| PAPER FEED UNIT (JAM OCCURRENCE SEGMENT:00, 01, 02) | SET FOR ALL | PAPER FEED AND CONVEYANCE ROLLER 1 | 1.00.001 | 40 |
| | | REGISTRATION ROLLER | 1.00.002 | 40 |
| | CASSETTE 1 | CASSETTE 1 PAPER FEED ROLLER | 1.01.001 | 88 |
| | | CASSETTE 1 PAPER CONVEYANCE ROLLER | 1.01.002 | 88 |
| TRANSFER UNIT (JAM OCCURRENCE SEGMENT:01, 02) | SET FOR ALL | PHOTOSENSITIVE DRUM | 2.00.001 | 30 |
| | | TRANSFER BELT | 2.00.002 | 45 |
| | | SEPARATION CLAW | 2.00.003 | 30 |
| | TWO-SIDED PRINTING | TWO-SIDED PAPER FEED ROLLER | 2.01.001 | 90 |
| | | TWO-SIDED REGISTRATION ROLLER | 2.01.002 | 90 |
| FIXING UNIT (JAM OCCURRENCE SEGMENT:01, 02) | SET FOR ALL | FIXING UNIT PAPER FEED ROLLER | ... | 30 |
| | | FIXING UNIT PAPER DISCHARGE ROLLER | ... | 30 |
| ... | ... | ... | ... | ... |

FIG. 23

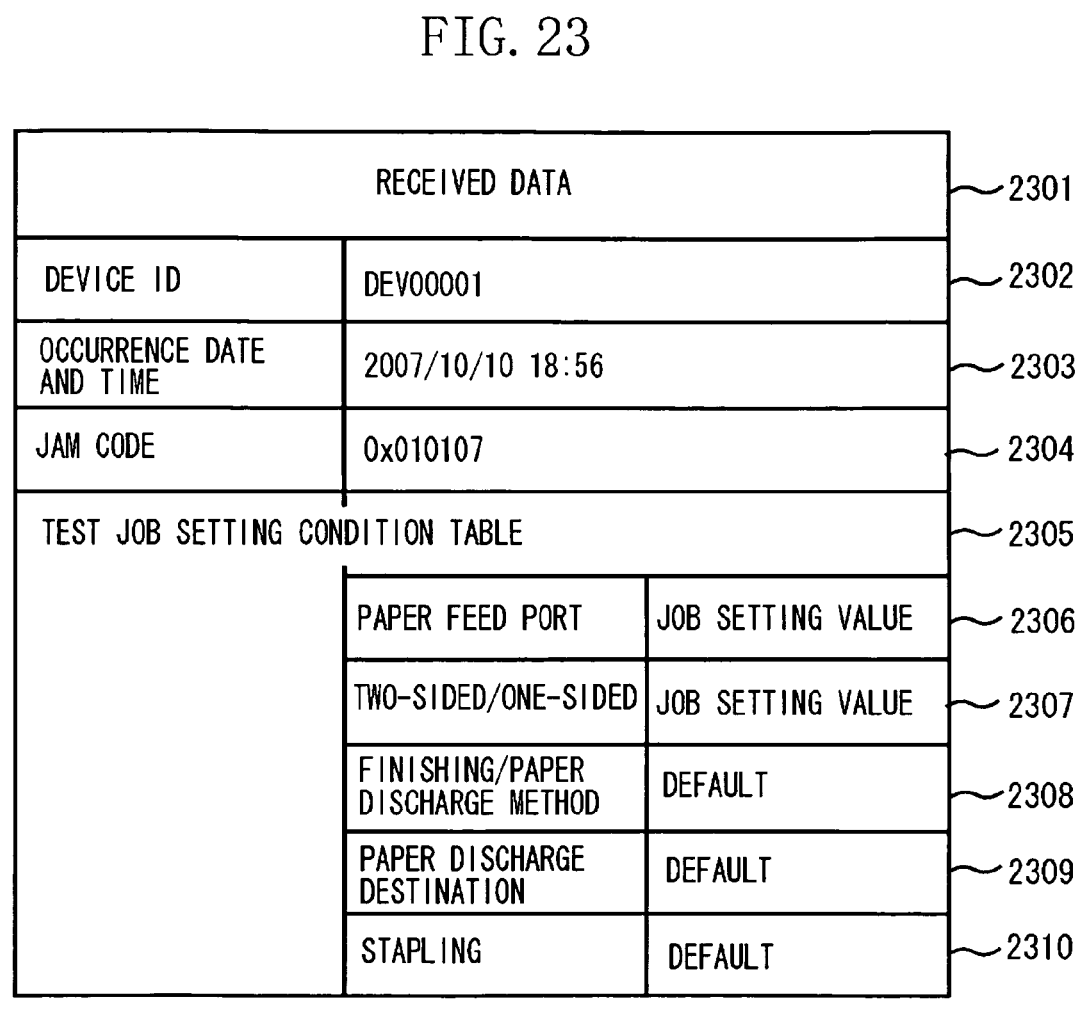

| | | | |
|---|---|---|---|
| RECEIVED DATA | | | 2301 |
| DEVICE ID | DEV00001 | | 2302 |
| OCCURRENCE DATE AND TIME | 2007/10/10 18:56 | | 2303 |
| JAM CODE | 0x010107 | | 2304 |
| TEST JOB SETTING CONDITION TABLE | | | 2305 |
| | PAPER FEED PORT | JOB SETTING VALUE | 2306 |
| | TWO-SIDED/ONE-SIDED | JOB SETTING VALUE | 2307 |
| | FINISHING/PAPER DISCHARGE METHOD | DEFAULT | 2308 |
| | PAPER DISCHARGE DESTINATION | DEFAULT | 2309 |
| | STAPLING | DEFAULT | 2310 |

FIG. 26

2602 2603 2604 2601

| OCCURRENCE DATE AND TIME | JAM CODE | TEST JOB PRINT SETTING | | | | |
|---|---|---|---|---|---|---|
| | | PAPER FEED PORT | TWO-SIDED/ ONE-SIDED | FINISHING/PAPER DISCHARGE METHOD | PAPER DISCHARGE DESTINATION | STAPLING |
| 2007/10/10 18:56 | 0x010107 | CASSETTE 114 | TWO-SIDED | SORTING | TRAY A | NO |

IMAGE FORMING APPARATUS AND INFORMATION PROCESSING METHOD

BACKGROUND OF THE INVENTION

1. Field of the Invention

The present invention relates to a method for executing a test for verifying the restoration from an error, such as a jam, that has occurred on an image forming apparatus.

2. Description of the Related Art

A conventional system provides information for allowing a user of an image forming apparatus and a service engineer to identify the location and the cause of an error that has occurred on an image forming apparatus (an apparatus such as a printer, a copying machine, or a multifunction peripheral (MFP)).

In this regard, a method discussed in Japanese Patent Application Laid-Open No. 11-091217 outputs a page including error information during a job in order to readily identify the location of an output error (an error that does not require the suspension of printing such as an image rasterization error or insufficient memory) that may occur during print processing of a plurality of sheets. If an error has occurred, the conventional method acquires the type of the output paper for a page previous to the page on which the error has occurred and print information including the size of the paper or the orientation of the sheet. In addition, the conventional method generates a job using an output paper whose type, size, or orientation is different from that described in the acquired information. Thus, the page on which the error has occurred can be easily identified from among a plurality of output pages. Furthermore, the content of the error can be easily recognized by referring to the output sheet including the error information.

Japanese Patent Application Laid-Open No. 05-270622 discusses a method for recording the history of a jam and displaying the content of the jam in order to enable a service engineer to easily recognize the cause of the jam. If a jam has occurred, the method records, on a jam history memory, the location of the jam, the location of a paper feed cassette which is a paper feed source of the jammed sheet, the size of the jammed sheet, and the print condition used at the time of the jam such as the print mode. By displaying the above-described information, the conventional method can allow the user or a service engineer to easily identify the cause of the jam according to the print condition.

A paper conveyance unit provided inside an image forming apparatus (an apparatus such as a printer, a copying machine, or an MFP) includes various sensors for detecting a sheet. If paper jamming (hereinafter simply referred to as a "jam") occurs, the jam is detected by the sensors. If a jam frequently occurs at the same location, a service engineer executes a maintenance operation such as the replacement of parts.

In executing a maintenance to solve a jam, the service engineer executes a test for simulating the jam to identify the location and the cause of the jam and another test for verifying that the jam has been solved after the maintenance. In this regard, the tests should be executed with the print setting with which the sheet used in the test is conveyed through the location of the jam. Accordingly, it is necessary that the service engineer can identify the print setting with which the sheet is conveyed through the jam location. In addition, it is necessary for the service engineer to execute a job after performing a print setting every time the test is executed.

With the method discussed in Japanese Patent Application Laid-Open No. 11-091217, a service engineer can identify the page on which an error has occurred and recognize the content of the error. However, a test job for simulating the error is not generated. Accordingly, it is necessary for the service engineer, in executing the maintenance after recognizing the content of the error, to newly generate a test job and perform a print setting for the job before executing the test.

If an error has occurred, the method discussed in Japanese Patent Application Laid-Open No. 11-091217 acquires information such as error information, information about an output paper sheet previous to the sheet for the page on which an error has occurred, and print information such as either of the size or the orientation of the sheet. Accordingly, the print setting for the page to be output including the error information may include limited information, namely, the type of the output paper sheet and the size or the orientation thereof.

The method discussed in Japanese Patent Application Laid-Open No. 05-270622 enables a service engineer to estimate the cause of the jam by referring to information about the location of the jam and attribute information of the job in which the jam has occurred, which is previously recorded and displayed on a screen of the apparatus. However, in simulating the jam during the maintenance, it is necessary for the service engineer to verify all possible cases that may be the cause of the jam and perform each print setting before executing a job for the test.

SUMMARY OF THE INVENTION

The present invention is directed to an image forming apparatus and an information processing method capable of easily executing a test for simulating a jam and verifying that the jam has been solved at the installation location of the image forming apparatus during a maintenance operation for the jam executed by a service engineer.

According to an aspect of the present invention, an image forming apparatus includes a storage unit configured to store attribute information about a job executed on the image forming apparatus, a detection unit configured to detect a jam that has occurred on the image forming apparatus, and a generation unit configured to generate a test job in which a print setting is set based on a type of the jam detected by the detection unit and the job attribute information corresponding to the jam and stored on the storage unit. The generation unit generates a test job in which a print setting different from a print setting described in the attribute information about the job stored on the storage unit and corresponding to the jam that has been detected by the detection unit is set.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 5 illustrates an example of a paper jam code list stored on a storage device of an image forming apparatus according to an exemplary embodiment of the present invention.

FIGS. 6A through 6C each illustrate an example of a print setting condition list stored on the storage device of the image forming apparatus according to an exemplary embodiment of the present invention.

FIG. 7 illustrates an example of information to be acquired if a jam has occurred according to the first exemplary embodiment of the present invention.

FIG. 9 illustrates an example of information for a test job according to the first exemplary embodiment of the present invention.

FIG. 12 illustrates an example of information to be acquired if a jam has occurred according to a second exemplary embodiment of the present invention.

FIG. 14 illustrates an example of information for a test job according to the second exemplary embodiment of the present invention.

FIG. 20 illustrates an example of data to be transmitted from the image forming apparatus to the management server according to the third exemplary embodiment of the present invention.

FIG. 21 illustrates an example of a setting-concerned component correspondence table stored on a storage device of the management server according to the third exemplary embodiment of the present invention.

FIG. 22 illustrates an example of a component consumption rate result list stored in the management server according to the third exemplary embodiment of the present invention.

FIG. 23 illustrates an example of data that the image forming apparatus receives from the management server according to the third exemplary embodiment of the present invention.

FIG. 26 illustrates an example of information for a test job according to the third exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
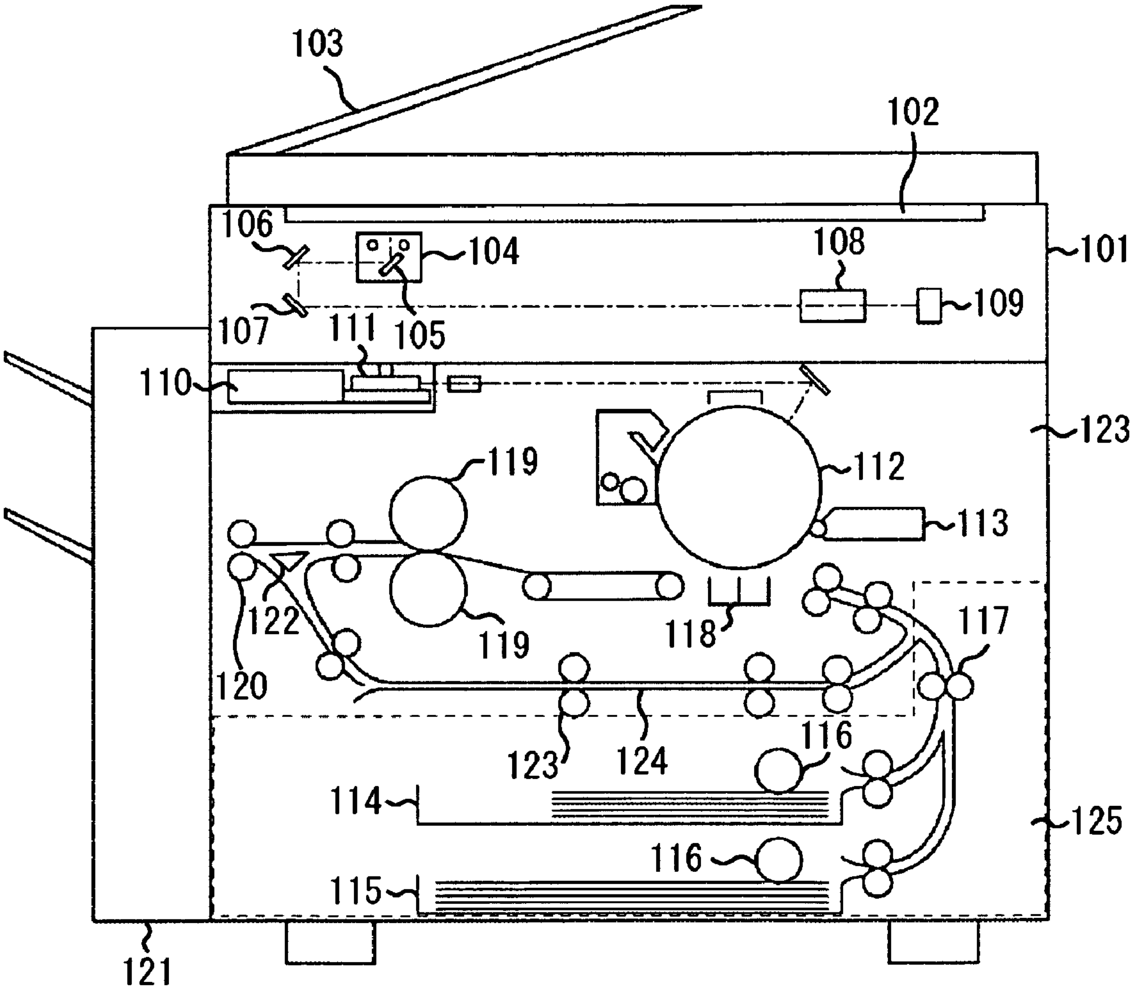
FIG. 1 is a cross section illustrating an exemplary configuration of an image forming apparatus according to an exemplary embodiment of the present invention.

FIG. 1 is a cross section illustrating an exemplary configuration of an image forming apparatus 101 according to a first exemplary embodiment of the present invention. In the present exemplary embodiment, the image forming apparatus 101 is an MFP (multi function peripheral) having a plurality of functions such as a print function, a scan function, a copy function, and a facsimile transmission function. However, a single function peripheral (SFP) having a print function only can be used as the image forming apparatus.

A user of the image forming apparatus sets a document on a document feed unit 103, which feeds the document sheet by sheet from the first sheet of the document onto a document positioning plate 102, or sets on the document positioning plate 102. The document set on the document positioning plate 103 or document positioning plate 102 is read by a moving unit 104. During reading of the document, light reflected from the document is guided to a charge-coupled device (CCD) image sensor (hereinafter simply referred to as a "CCD") 109 via mirrors 105 through 107 and a lens 108. Thus, an image of the document is formed on an imaging plane of the CCD 109. A laser driver 110 drives a laser emission unit 111 according to image data input from a control apparatus. Thus, the laser emission unit 111 emits a laser beam according to the image data. The laser beam is irradiated onto a photosensitive drum 112 while being scanned. On the photosensitive drum 112, an electrostatic latent image is formed by the laser beam irradiated thereon. The electrostatic latent image is converted into a visual toner image with a toner supplied from the development unit 113.

A recording sheet is fed by a paper feed roller 116 from paper cassettes 114 and 115 in synchronization with the timing of the irradiation of the laser beam. Then, the recording sheet is conveyed to a nip portion between the photosensitive drum 112 and a transfer unit 118 via a conveyance roller 117. The toner image on the photosensitive drum 112 is then transferred onto the recording sheet by the transfer unit 118.

The recording sheet having the toner image is then transmitted to a fixing roller pair (a heating roller and a pressure roller) 119. The fixing roller pair 119 heats and presses the recording sheet to fix the toner image on the recording sheet. After exiting from the fixing roller pair 119, the recording sheet is discharged to the paper discharge unit 121 by a paper discharge roller pair 120. The paper discharge unit 121 is constituted by a sheet processing apparatus capable of executing postprocessing such as sorting and stapling.

If a two-sided print mode has been set, the rotational direction of the paper discharge roller pair 120 is reversed after conveying the recording sheet to the paper discharge roller pair 120 to guide the recording sheet into paper refeed conveyance paths 123 and 124 by a flapper 122. After being guided into the paper refeed conveyance paths 123 and 124, the recording sheet is fed again to a nip portion between the photosensitive drum 112 and the transfer unit 118 at the above-described timing. Then, the toner image is transferred on the back surface of the recording sheet.

In addition, jam sensors (not illustrated) for detecting a jam are provided at appropriate positions of the above-described paper conveyance unit.

A portion of the recording sheet conveyance path from the cassettes 114 and 115 to the conveyance roller 117 (the portion surrounded with broken lines in FIG. 1) is hereafter referred to as a "paper feed unit" 125. The paper discharge unit 121 is hereafter referred to as a "finisher 121", while components other than the paper feed unit 125 and the finisher 121 are hereinafter collectively referred to as a "main body unit 123".

Figure 2:
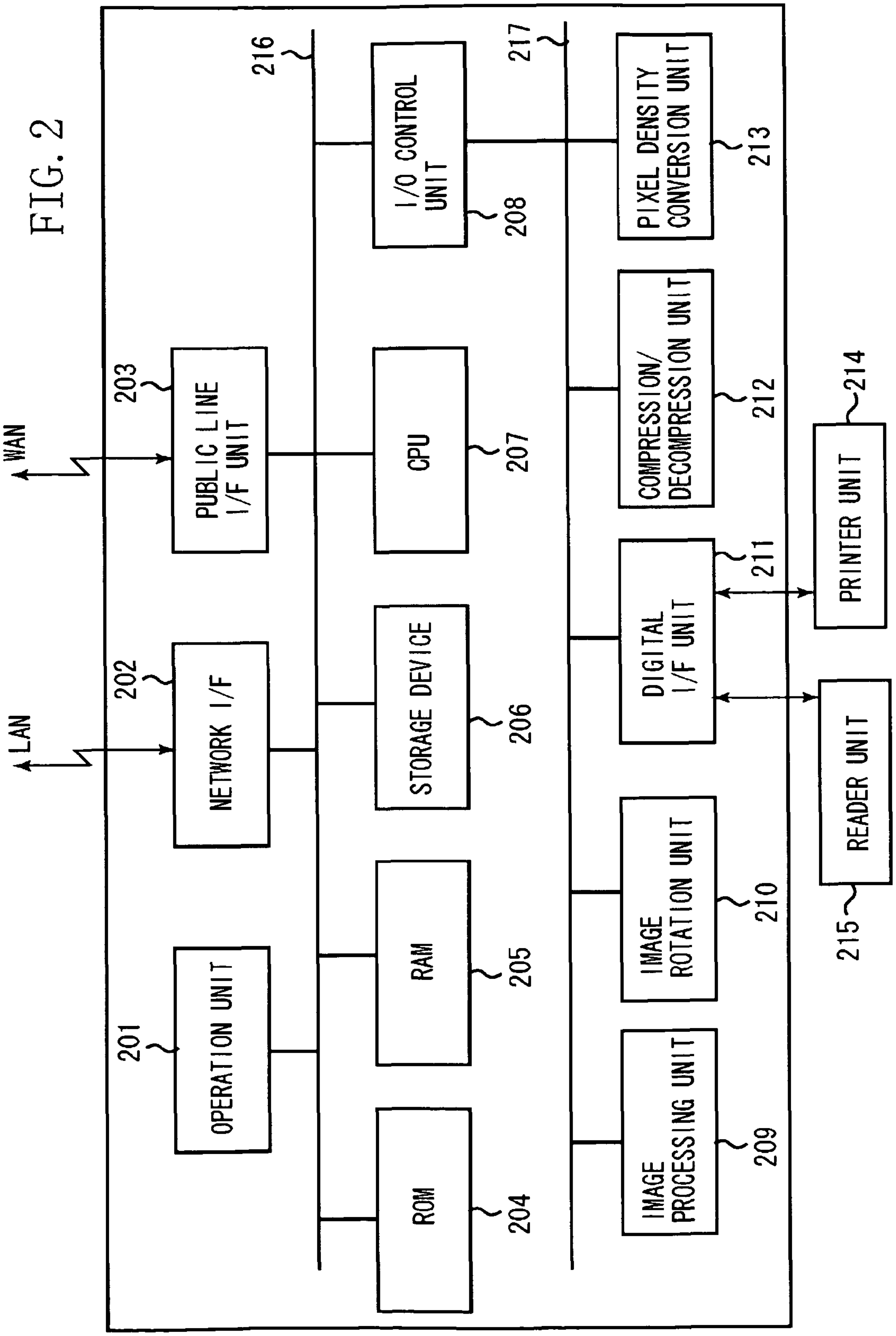
FIG. 2 illustrates an exemplary hardware configuration of an image forming apparatus according to a first exemplary embodiment of the present invention.

FIG. 2 illustrates an exemplary hardware configuration of the image forming apparatus 101 according to the present exemplary embodiment.

Each component illustrated in FIG. 2 is connected to a system bus 216 and an image bus 217. A read-only memory (ROM) 204 stores the control program (not illustrated) for controlling the image forming apparatus 101 and a test job generation program for generating a test job according to jam code. The control program is executed with a central processing unit (CPU) 207. A random access memory (RAM) 205 is a work memory area for executing a program and a temporary storage memory area for temporarily storing image data. A storage device 206 is a non-volatile storage device storing an identification (ID) and an operation log, which should be stored after rebooting the image forming apparatus 101. A network interface (I/F) 202 is an interface with a local area network (LAN). The network I/F 202 inputs and outputs information with external apparatuses on a network via the LAN. A public line I/F unit 203 is connected to the integrated services digital network (ISDN) and the public switched telephone network (PSTN) The public line I/F unit 203 is controlled by a communication control program stored on the ROM 204 to execute data communication with a remote terminal via an ISDN I/F, a modem, or a network control unit (NCU). The public line I/F unit 203 is also used for transmitting a facsimile.

An operation unit 201 includes therein a display unit and a key input unit, which are controlled by the CPU 207. An operator can input various settings related to reading an image with a scanner or printing and outputting the read document image and issue instructions for executing and suspending processing via the key input unit.

The above-described image forming apparatus is connected to the system bus 216. An input/output (I/O) control unit 208 is a bus bridge for connecting the system bus 216 with the image bus 217, which transfers image data at a high data transfer speed. A peripheral component interconnect (PCI) bus or Institute of Electrical and Electronic Engineers (IEEE) 1394 can be used as the image bus 217. The image forming apparatus having the following configuration is connected to the image bus 217.

The digital I/F unit 211 connects a reader unit 215 and a printer unit 214 of the image forming apparatus with the I/O control unit 208 to execute the synchronous/asynchronous conversion on image data. Furthermore, information detected by the sensors disposed at appropriate positions of the reader unit 215 and the printer unit 214 is transmitted to the system bus 216 via the digital I/F unit 211 and the I/O control unit 208. An image processing unit 209 executes correction, image processing, and editing on input or output image data. An image rotation unit 210 rotates the image data. An image compression/decompression unit 212 executes compression and decompression on multivalued image data by Joint Photographic Experts Group (JPEG) format. Furthermore, the image compression/decompression unit 212 executes compression and decompression on binary image data by Joint Bi-level Image Experts Group (JBIG), Modified Modified Read (MMR), Modified Read (MR), or Modified Huffman (MH) format. A pixel density conversion unit 213 converts the resolution of image data to be output.

By executing a test job generation program, the CPU 207 acquires a jam code of a jam that has occurred and attribute information (print setting such as the paper size, the paper feed port, and the paper discharge destination) of a job in which the jam has occurred from the storage device 206. Then, the CPU 207 generates a test job for executing a test for the jam based on the above-described information.

If a jam has been detected by the jam sensor in the printer unit 214, information (a jam code, for example) about the jam is transmitted to the system bus 216 via the digital I/F unit 211 and the I/O control unit 208. The jam information transmitted to the system bus 216 is then stored on the storage device 206 as the history information. Furthermore, a test job execution input by the user via the operation unit 201 is transmitted to the CPU 207.

Figure 3:
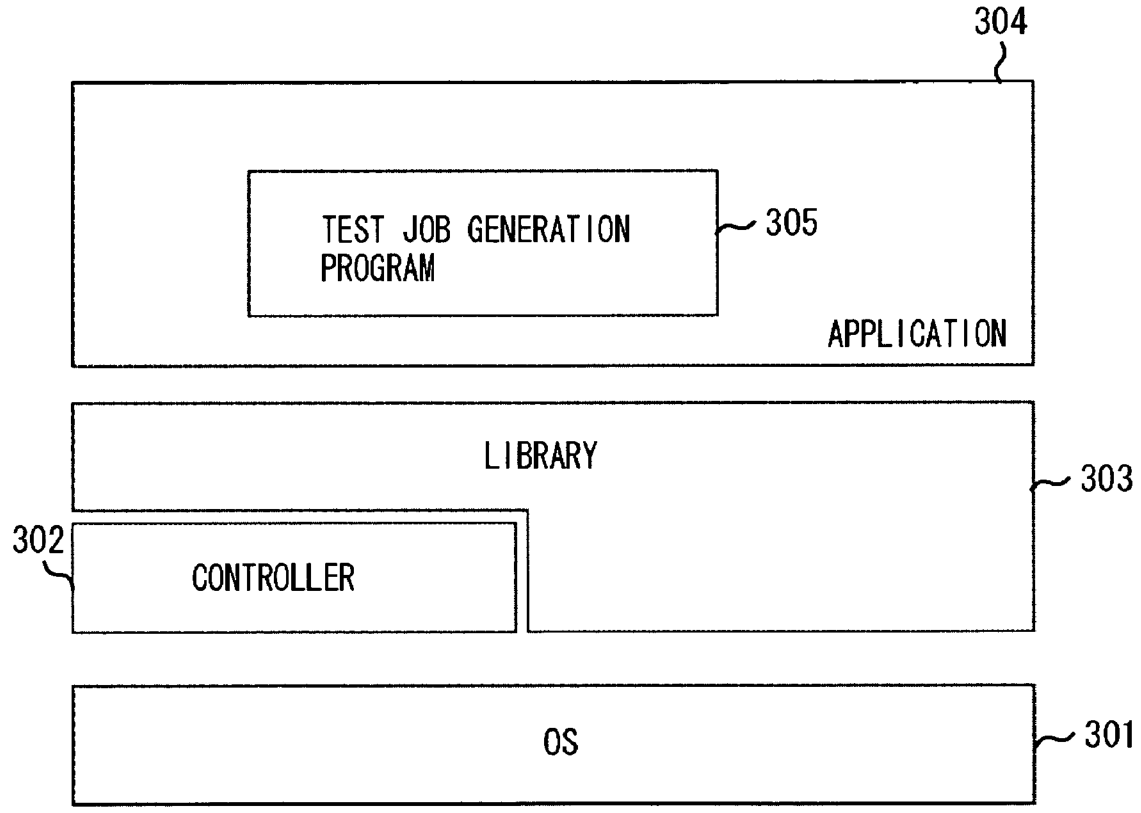
FIG. 3 illustrates an exemplary software configuration of the image forming apparatus according to the first exemplary embodiment of the present invention.

FIG. 3 illustrates an exemplary software configuration of the image forming apparatus 101 according to the first exemplary embodiment.

Note here that in FIG. 3, software significant to the present exemplary embodiment only is illustrated and other programs that are not characteristic to the present exemplary embodiment are omitted.

In booting the system, the CPU 207 reads a system boot program (not illustrated) from the ROM 204 and starts system boot processing. Furthermore, the CPU 207 loads and executes the program from the storage device 206 on the RAM 205.

Referring to FIG. 3, the storage device 206 stores an operating system (OS) 301, a controller 302, a library 303, and an application 304.

A jam code of the jam that has occurred and a test job generation program 305 for generating a test job for the jam based on attribute information of the job in which the jam has occurred are included in the application 304 as a part thereof.

Figure 4:
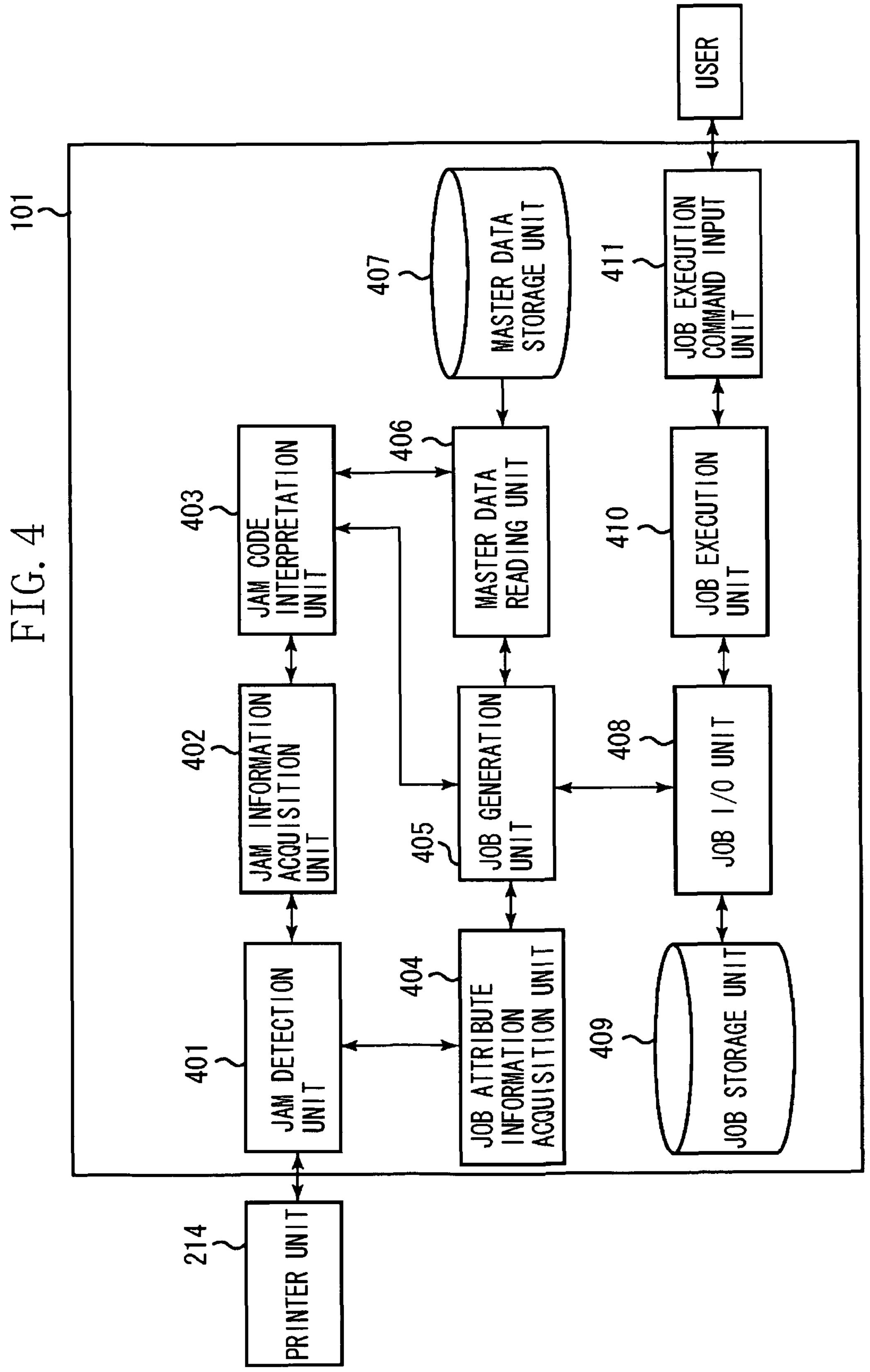
FIG. 4 illustrates an exemplary functional configuration of an image forming apparatus according to an exemplary embodiment of the present invention.

FIG. 4 illustrates the function of the image forming apparatus 101 related to the test job generation program 305.

If a jam has occurred in the printer unit 214, the test job generation program 305 detects the jam with a jam detection unit 401. After detecting that the jam has occurred with the jam detection unit 401, the test job generation program 305 acquires jam information stored on the storage device 206 with a jam information acquisition unit 402. Furthermore, the test job generation program 305 acquires attribute information of the job in which the jam has occurred with a job attribute information acquisition unit 404. The acquired job attribute information (information including a print setting such as a setting for the two-sided or one-sided mode and a paper discharge method) is stored on a storage medium such as the storage device 206.

Furthermore, the image forming apparatus 101 includes a jam code interpretation unit 403. The jam code interpretation unit 403 interprets the jam code acquired by the jam information acquisition unit 402 to identify the location of the jam. The jam code interpretation unit 403 refers to a jam code list stored in the master data storage unit 407 via the master data reading unit 406. The master data storage unit 407 is stored on the storage device 206. The master data storage unit 407 stores a print setting condition table including conditions of the print setting for conveying the recording sheet through the location of the jam based on the corresponding jam code. The print setting condition table will be described in detail later below with reference to FIGS. 6A through 6C. Furthermore, a job generation script (not illustrated) is also stored on the master data storage unit 407 as a template for generating a test job. A job is transmitted to the printer unit 214 to request the same to execute printing. It is necessary that a job be described with a programming language compliant with the capacity of the printer unit 214 so that the job can be interpreted thereby. The job generation script is a job in which no print setting is described as a template of the job.

A job generation unit 405 generates a test job based on the information acquired by the jam code interpretation unit 403 and the job attribute information acquisition unit 404. The job generation unit 405 refers to the print setting condition table stored on the master data storage unit 407 via the master data reading unit 406 to generate a test job. The job generation unit 405 generates a test job by reading the job generation script stored on the master data storage unit 407 and embedding a print setting for the test job on the read job generation script.

The generated test job is stored on a job storage unit 409 via a job I/O unit 408. The acquired jam information is added to the generated test job before storing the job on the job storage unit 409.

Furthermore, the test job generation program 405 includes a job execution command input unit 411 that receives a user input for executing the test job. When the user inputs a command for executing the job on the operation unit 201, the input job execution command is transferred to the job execution command input unit 411. When the job execution command is input, the job execution unit 410 reads the test job stored on the job storage unit 409 to execute the input job. The input job is output by the printer unit 214.

FIG. 5 illustrates an example of a paper jam code list stored on the storage device 206 of the image forming apparatus 101 according to the present exemplary embodiment.

Referring to FIG. 5, a jam code list 501 includes jam codes, each of which is described in six character hexadecimal number. More specifically, the first two characters indicate an occurrence segment 502 (the paper feed unit, the main body unit, or the finisher). The subsequent two characters indicate the jam type 503 (delay or congestion). The last two characters indicate the jam location 504 (a paper feed cassette 1, a registration roller, or the like). A jam detailed description 505 indicates the detailed content of the jam.

FIGS. 6A through 6C each illustrate an example of a print setting condition list stored on the storage device 206 of the image forming apparatus 101 according to the present exemplary embodiment.

A print setting condition table 601 stores a condition for a jam whose occurrence segment is the paper feed unit 125. A print setting condition table 611 stores a condition for a jam whose occurrence segment is the main body unit 123. A print setting condition table 621 stores a condition for a jam whose occurrence segment is the finisher 121.

The tables further store a jam location (602, 612, and 622) and a print setting (603, 613, and 623).

Parameters "default" and "job setting value" are used for setting which of a default setting value and a setting value for the jam-occurring job is to be used as the condition for the print setting of the test job. For example, with respect to a test job for a jam that has occurred in the paper feed cassette 114, it is necessary to set the paper feed cassette 114 as the setting for the paper feed unit. If a paper feed unit other than the paper feed cassette 114 is set, the recording sheet is not fed from the paper feed cassette 114. On the other hand, regardless of the setting for the print mode (two-sided or one-sided printing) and the paper discharge destination, the recording sheet is fed from or conveyed through the locations of the paper feed cassette 114 delay jam.

Accordingly, unless an appropriate print setting is set for the test job, the recording sheet may not be fed from or conveyed through the location of the jam. Accordingly, if the recording sheet is sure to be fed from or conveyed through the location of the jam regardless of the print setting for the job, the parameter "default" is set. Furthermore, if the recording sheet may not be fed from or conveyed through the location of the jam, the parameter "job setting value" is set so as to set the same print setting as that for the jam-occurring job.

In the present exemplary embodiment, it is supposed that a saddle stitcher conveyance path sensor congestion jam whose jam code is 0x0211A1 has occurred. Here, the first two characters of the jam code are "02", which indicates that the occurrence segment is the finisher 121. In this case, the print setting condition table 621 is then referred to. Here, the last two characters of the jam code are "A1". Accordingly, it can be known, by referring to the field indicating the saddle stitcher conveyance path as the jam location 622, that the parameter "job setting value" is set for the paper feed unit and that the parameter "default" is set for each of items "two-sided/one-sided", "two-sided/one-sided", "finishing/paper discharge method", "paper discharge destination", and "stapling".

FIG. 7 illustrates an example of information to be acquired by the jam information acquisition unit 402 and the job attribute information acquisition unit 404 if a jam has occurred according to the present exemplary embodiment. In the present exemplary embodiment, the acquired information is stored on the storage device 206.

A field 701 indicates the date and time of the jam. A field 702 indicates the jam code detected by the jam sensor in the printer unit 214. As attribute information of the jam-occurring job, print setting information, such as paper size 703, paper feed port 704, two-sided/one-sided information 705, finishing/paper discharge method 706, paper discharge destination 707, and stapling 708, is stored.

Figure 8:
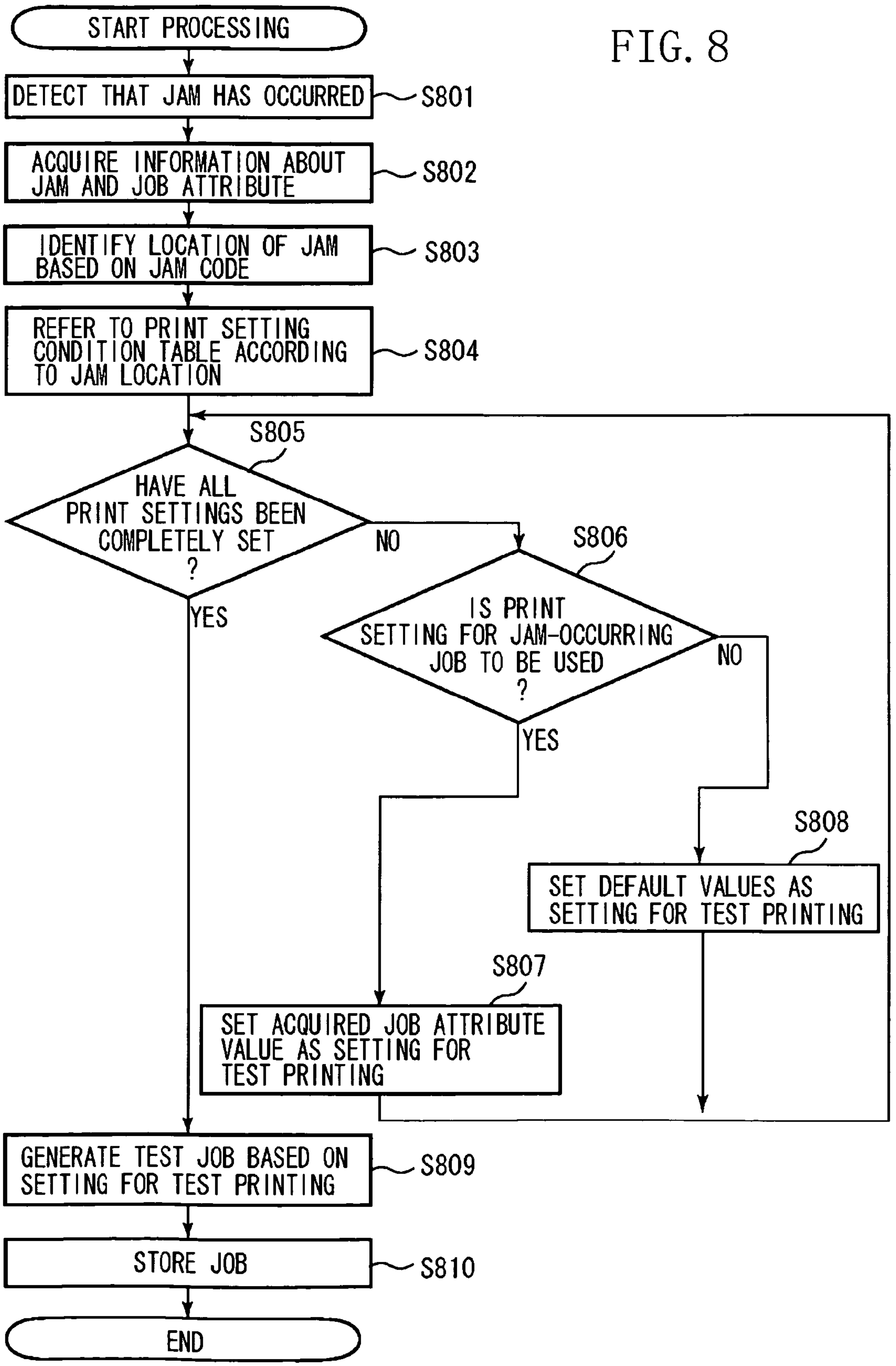
FIG. 8 is a flow chart illustrating an exemplary flow of processing executed by the image forming apparatus according to the first exemplary embodiment of the present invention.

FIG. 8 is a flow chart illustrating an exemplary flow of processing according to the present exemplary embodiment, which is executed by the image forming apparatus 101 by executing a program therefor.

In step S801, the image forming apparatus 101 detects that a jam has occurred with the jam detection unit 401.

In step S802, the image forming apparatus 101 acquires the jam code and the job attribute information by using the jam information acquisition unit 402 and the job attribute information acquisition unit 404. Then, the image forming apparatus 101 stores the acquired jam code and the job attribute information on the RAM 205.

In step S803, the image forming apparatus 101 acquires the jam code stored on the RAM 205 by the jam code interpretation unit 403. Then, the image forming apparatus 101 refers to the jam code list via the master data output unit 406 to identify the location of the jam.

In step S804, the image forming apparatus 101 refers to the print setting condition tables 601, 611, and 621 stored on the storage device 206 and serially executes each print setting by the job generation unit 405. The print setting values of the test job are stored on the RAM 205.

In step S805, the image forming apparatus 101 determines whether all of the print setting items of the test job have been completely set by the job generation unit 405. If it is determined in step S805 that not all of the print setting items of the test job have been completely set by the job generation unit 405 (NO in step S805), then the processing advances to step S806.

In step S806, the image forming apparatus 101 determines which of the parameters "job setting value" and "default" in the print setting condition table referred to in step S804 has been set for each print setting item of the test job. If it is determined in step S806 that the set parameter of the concerned print setting item is "job setting value" (YES in step S806), then the processing advances to step S807. On the other hand, if it is determined in step S806 that the set parameter of the concerned print setting item is "default" (NO in step S806), then the processing advances to step S808.

In step S807, the image forming apparatus 101 acquires the print setting from the job attribute information stored on the RAM 205 and sets the acquired print setting as the setting of the test job.

In step S808, the image forming apparatus 101 sets the default setting for the test job. In the present exemplary embodiment, the default setting is "auto".

In the present exemplary embodiment, the jam code of the concerned jam is "0x0211A1" (FIG. 7). Accordingly, the image forming apparatus 101 refers to the print setting condition table 621. The print setting set in this case is as follows: "paper feed unit": default, "two-sided/one-sided": job setting value, "finishing/paper discharge method": job setting value, "paper discharge destination": job setting value, and "stapling": job setting value. The value of the acquired job attribute information is used for the print setting for which the parameter "job setting value" is set. The parameter "auto" is set for the print setting for which the parameter "default" is set.

In the present exemplary embodiment, the following print setting is set for the test job: paper feed unit: auto, two-sided/one-sided: two-sided, finishing/paper discharge method": sorting, paper discharge destination: tray A, and stapling: auto. Here, the parameter "auto" for the item "stapling" means that stapling has not been designated.

After completely setting all the print settings (YES in step S805), the image forming apparatus 101 advances to step S809.

In step S809, the image forming apparatus 101 acquires each print setting stored on the RAM 205 and generates a test job based thereon.

In step S810, the image forming apparatus 101 stores the generated job on the storage device 206 together with the jam information acquired in step S802.

FIG. 9 illustrates an example of information for a test job to be stored on the storage device 206 in step S810 according to the present exemplary embodiment.

Information 901 indicates information for the test job. The information 901 includes date and time 902 of a jam corresponding to the test job. In addition, the information 901 includes a jam code 903 and a print setting for a test job 904.

Figure 10:
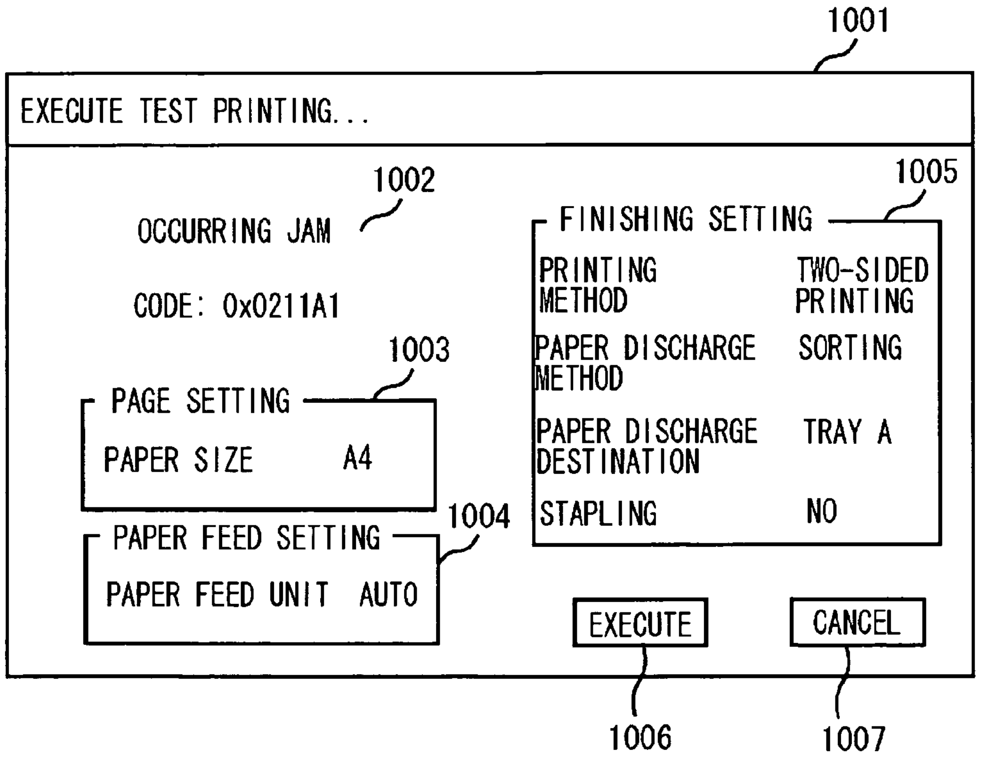
FIG. 10 illustrates an example of a test job execution instruction screen according to the first exemplary embodiment of the present invention.

FIG. 10 illustrates an example of a test job execution instruction screen used for executing the test job stored on the storage device 206 in the above-described manner according to the present exemplary embodiment.

Referring to FIG. 10, a test job execution instruction screen 1001 includes a jam code of the occurring jam 1002, a page setting of the test job 1003, a paper feed setting 1004, and a finishing setting 1005.

When the user presses an execution button 1006, the execution of the test job is started. On the other hand, when the user presses a cancel button 1007, the test job is not executed and the processing ends or the screen returns to a previously displayed screen.

In the test job information 901, the print setting of the test job and the jam occurrence date and time and the jam code are stored on the storage device 206. Accordingly, by referring to the jam occurrence date and time and the jam code, the test job can be linked with a jam history.

Figure 11A:
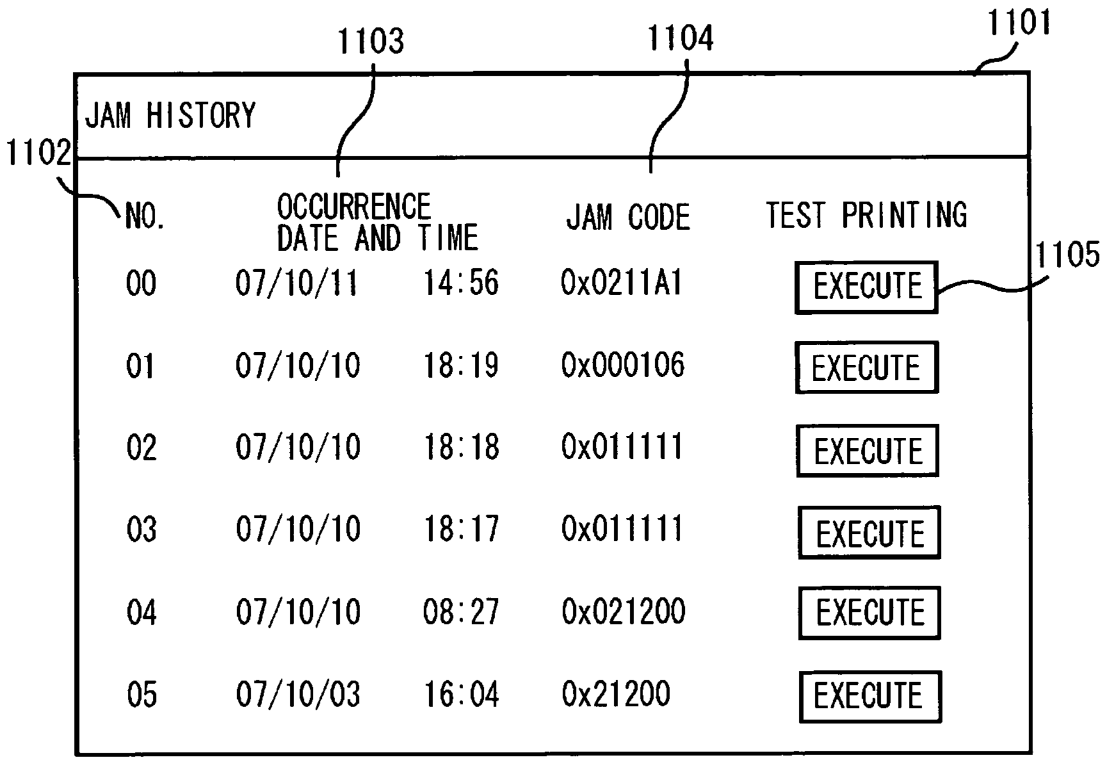
FIGS. 11A through 11C each illustrate an example of a test job execution instruction screen when a test job linked with a jam history is recorded according to the first exemplary embodiment of the present invention.
Figure 11B:
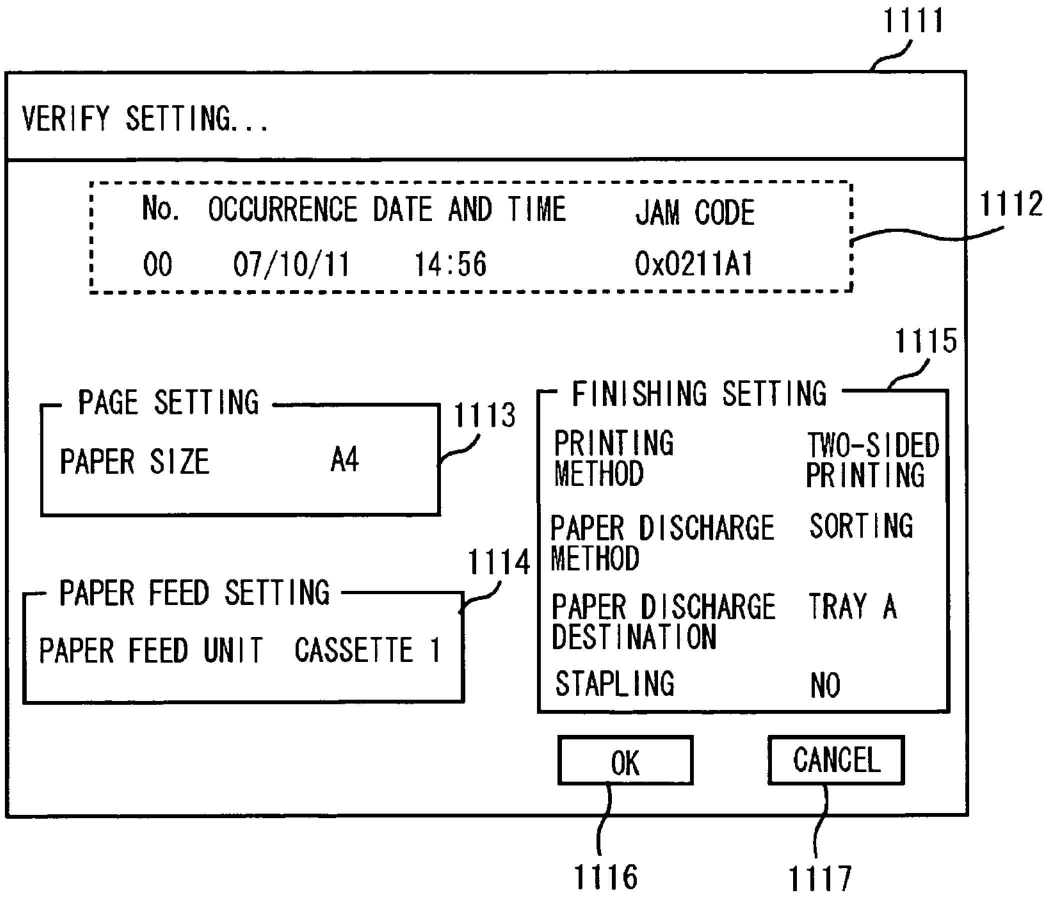
Figure 11C:
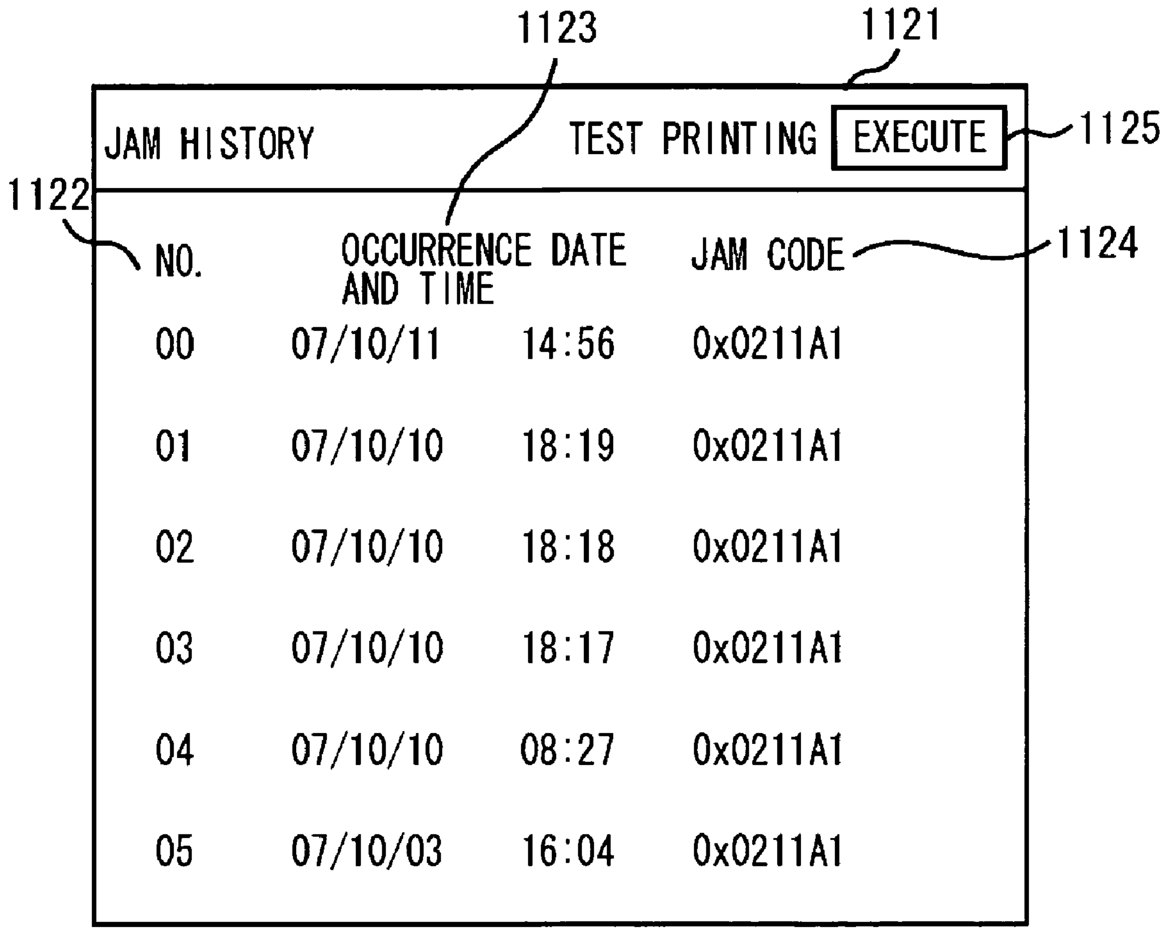

FIGS. 11A through 11C each illustrate an example of a test job execution instruction screen when a test job is linked with the jam history according to the present exemplary embodiment.

A screen 1101 displays a jam history list. The jam history list display screen 1101 includes a jam history number 1102, jam occurrence date and time 1103, and a jam code 1104. An execution button 1105 can be operated by the user to execute a test job for each jam.

It is also useful if a setting verification screen 1111 (FIG. 11B) is displayed when the user has pressed the test job execution button 1105. The setting verification screen is an instruction screen via which the user instructs the execution of a test job. The setting verification screen 1111 includes a field 1112 that displays information about the selected jam (the jam history number, the jam occurrence date and time, and the jam code). The setting verification screen 1111 further includes a page setting for the test job 1113, a paper feed setting 1114, and a finishing setting 1115. When the user presses an OK button 1116, the test job is executed. On the other hand, when the user presses a cancel button 1117, the test job is not executed and the screen returns to a previous screen.

Here, if the same jam has consecutively and frequently occurred for a plurality of times, then the test jobs having the same print setting are stored. In this case, it is useful if the test job for the last jam is executed via a jam history display screen 1121 illustrated in FIG. 11C. The jam history display screen 1121 includes a jam history number 1122, jam occurrence date and time 1123, and a jam code 1124. An execution button 1125 can be operated by the user to execute a test job for the last jam.

With the above-described configuration, the present exemplary embodiment can execute a jam simulation test for a maintenance operation by a service engineer for a jam that has occurred on an image forming apparatus such as the replacement of components and a test for verifying that the jam has been solved by the maintenance without executing the setting at the time of the test.

Furthermore, in the present invention, it is more useful, in generating a test job, if a test job different from that for a job executed due to a jam is generated. In this regard, if a job executed due to a jam includes printing of ten copies of a document including one hundred pages and if the job is executed with the setting as it is, the printing unnecessary for merely verifying that the jam has been solved may be executed. Furthermore, if the job due to a jam is executed with the current setting as it is, the recording sheet may not be fed or conveyed through jam occurring locations. Accordingly, in the present embodiment, an optimum test job is generated according to the jam type and attribute information of a job executed due to a jam. It is supposed here that a sheet for one page is discharged for one test job unless otherwise specified.

With respect to a jam that may occur when a plurality of jobs is serially executed, if one jam occurs, the jam may be detected by a plurality of jam sensors in the image forming apparatus 101 at the same time. Furthermore, in differently executing processing on each sheet in one job at the paper feed port or a finisher processing unit due to a complicated combination of print settings, jams may be detected at a plurality of locations.

Hereinbelow, an operation will be described that is executed for efficiently generating a test job in which the recording sheet is fed from or conveyed through jam occurring locations in verifying the restoration from a plurality of errors (jams) that has occurred in the above-described case.

Exemplary job attribute information corresponding to various types of jams stored on the storage device 206 as in the first exemplary embodiment is illustrated in FIG. 12. It is supposed here that jams (jams 1 through 3) have occurred at three different locations at the same time.

In FIG. 12, the job attribute information includes jam occurrence date and time 1201, the total counter 1202 of the image forming apparatus 101, which is acquired via the controller 302, and a jam code 1203 detected by the jam sensor in the printer unit 214. By referring to the jam code list 501 (FIG. 5), it can be known that the jam 1 is a paper feed cassette 114 delay jam, that the jam 2 is a paper feed cassette 115 delay jam, and that the jam 3 is a saddle stitcher conveyance path sensor congestion jam.

As the attribute information of the jam-occurring job, setting information, such as paper size 1204, paper feed port 1205, two-sided/one-sided 1206, finishing/paper discharge method 1207, paper discharge destination 1208, and stapling 1209, is stored.

By referring to the jam occurrence date and time 1201 and the total counter 1202 of occurring jams, it can be known that the three jams (FIG. 12) have occurred during the same job at the same time.

In the three jams, the setting values for the paper size 1204 and the paper feed port 1205 of the jam 2 are different from those for the jams 1 and 3 because in the present invention, the setting for the page size and the paper feed port can be differently set for each page.

Figure 13:
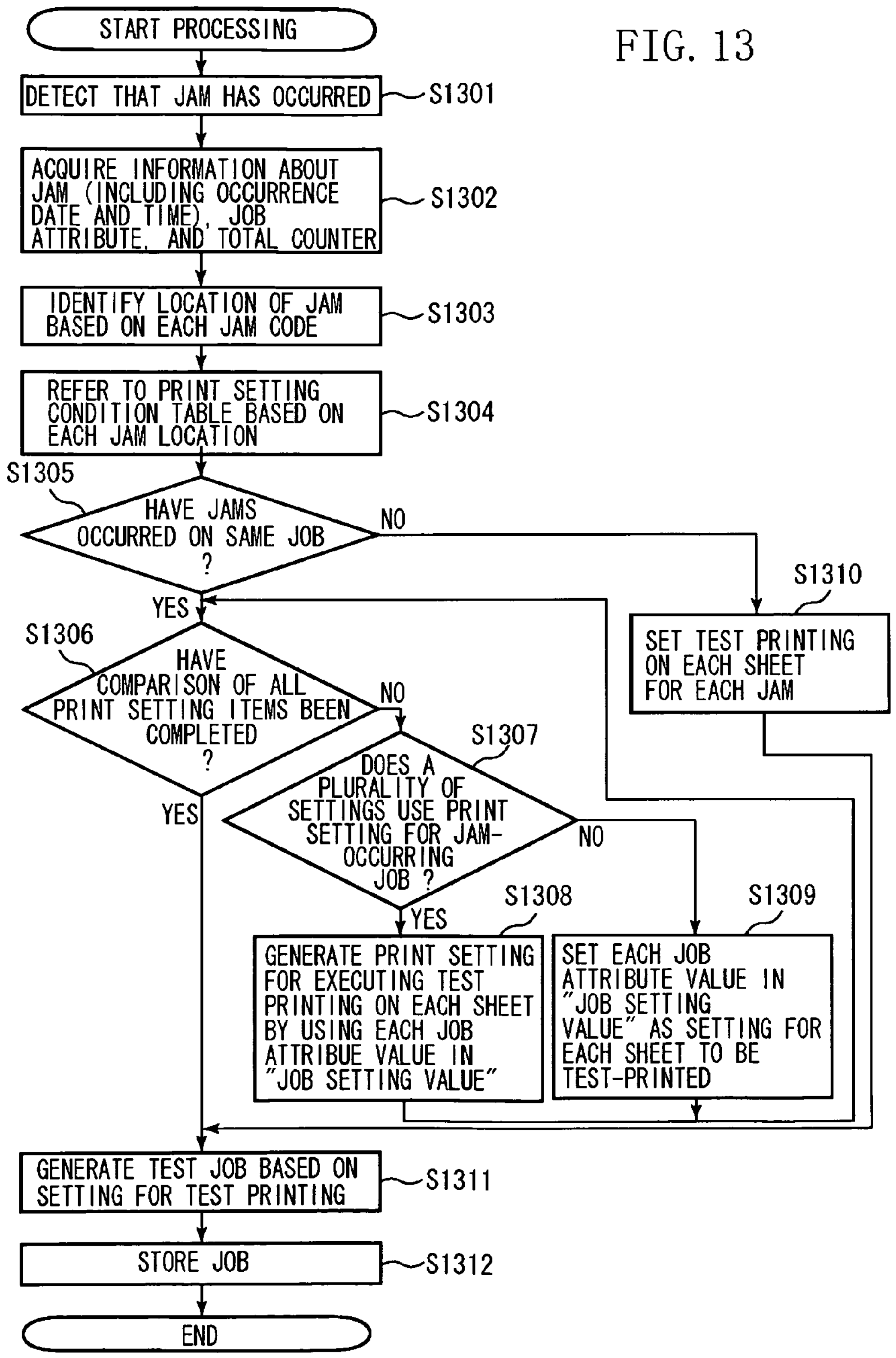
FIG. 13 is a flow chart illustrating an exemplary flow of processing executed by an image forming apparatus according to the second exemplary embodiment of the present invention.

FIG. 13 is a flow chart illustrating an exemplary flow of processing executed by the image forming apparatus 101 by executing a program therefor according to the second exemplary embodiment of the present invention.

In step S1301, if a jam has occurred, the image forming apparatus 101 detects the jam with the detection unit 401.

In step S1302, the image forming apparatus 101 acquires the jam code and the job attribute information (FIG. 12) and stores the same on the RAM 205.

In step S1303, the image forming apparatus 101 identifies the location of the jam based on each jam code stored on the RAM 205 by using the jam code interpretation unit 403.

In step S1304, the image forming apparatus 101 refers to the print setting condition tables 601, 611, and 621 stored on the storage device 206 by the job generation unit 405 with respect to each jam.

In step S1305, the image forming apparatus 101 compares the jam occurrence date and time and the total counter of the occurring jam, among the jams and the job attribute information stored on the RAM 205 in step S1302.

If it is determined that the jams have occurred in different jobs (NO in step S1305), then the processing advances to step S1310. On the other hand, if it is determined that the jams have occurred in the same job (YES in step S1305), then the processing advances to step S1306. The print setting value of the test job to be set in subsequent steps are to be stored on the RAM 205.

Here, it is supposed that the jams have occurred in the same job. Accordingly, the processing advances to step S1306. More specifically, it is supposed that a paper feed cassette 114 delay jam (the jam 1), a paper feed cassette 115 delay jam (the jam 2), and a saddle stitcher conveyance path sensor congestion jam (the jam 3) have occurred.

If it is determined by the image forming apparatus 101 in step S1306 that the comparison for not all of the print setting items to be set for the test job has been completed (NO in step S1306), then the processing advances to step S1307.

In step S1307, the image forming apparatus 101 refers to the print setting condition tables 601, 611, and 621 to compare the parameters ("job setting value" and "default") set for the item of each jam. Furthermore, the image forming apparatus 101 acquires the print setting from the job attribute information stored on the RAM 205 and compares the setting values set therefor. If the parameter "job setting value" is set for the compared print setting with respect to two or more jams and if the jams have different print settings (YES in step S1307), then the processing advances to step S1308. On the other hand, if the parameter "job setting value" is set for the compared print setting with respect to less than two jams (NO in step S1307), then the processing advances to step S1309.

In the present exemplary embodiment, it can be known that the parameter "job setting value" has been set for the setting of the paper feed port with respect to the jams 1 and 2. In addition, the setting values of the paper feed port for each of the jams 1 and 2 are "cassette 114" and "cassette 115". Accordingly, the processing advances to step S1308. Furthermore, with respect to the jam 3 only, the parameter "job setting value" is set for the items "two-sided/one-sided", "finishing/paper discharge method", and "paper discharge destination". The setting value set thereto is "two-sided", "sorting", and "tray A". Accordingly, the processing advances to step S1309.

In step S1308, the image forming apparatus 101 generates a print setting for a test job with which the recording sheet is output sheet by sheet with each setting so that all of the print settings for the jams whose compared print setting has the parameter "job setting value" are to be set. In this case, in a test job for outputting only one recording sheet, a job in which the recording sheet is conveyed through both the locations of the jams 1 and 2 cannot be generated. Accordingly, the image forming apparatus 101 sets the print setting of the paper feed port with respect to two test jobs so that one recording sheet is output in each job, by applying the setting values of the paper feed port "cassette 114" and "cassette 115", respectively.

In step S1309, the image forming apparatus 101 applies the print setting of the jam whose compared print setting has the parameter "job setting value" as the setting for the test job. In the present exemplary embodiment, the setting for the item "two-sided/one-sided" has the parameter "job setting value" for the jam 3 only. Accordingly, the image forming apparatus 101 sets the parameter "two-sided" for the setting for the item "two-sided/one-sided" with respect to the jam 3 as the setting of the setting item "two-sided/one-sided" of the test job that has been generated in the above-described manner. With respect to the other settings, the parameter "job setting value" is set for the jam 3 only. Accordingly, the other setting of the test job is determined in the above-described manner. With respect to the setting of the setting item "stapling", the parameter "default" is set for all of the jams. Accordingly, the parameter "default" is set for the setting item "stapling" of the test job. In the present exemplary embodiment, the parameter "no" is set for the setting item "stapling" as the default setting value.

In step S1311, the image forming apparatus 101 acquires each print setting stored on the RAM 205 and generates a test job based thereon.

In step S1312, the image forming apparatus 101 stores the test job generated in step S1311 on the storage device 206.

FIG. 14 illustrates an example of information for a test job stored on the storage device 206 in step S1312 according to the second exemplary embodiment of the present invention.

Information for test job 1401 includes job occurrence date and time 1402 corresponding to the test job and a jam code 1403. In the present exemplary embodiment, three jams have occurred. Accordingly, the test job information 1401 includes information about the three jams. The test job information 1401 further includes each test job print setting 1404. In the present exemplary embodiment, two recording sheets are to be output. Accordingly, the test job information 1401 includes different print settings for the sheets.

Figure 15:
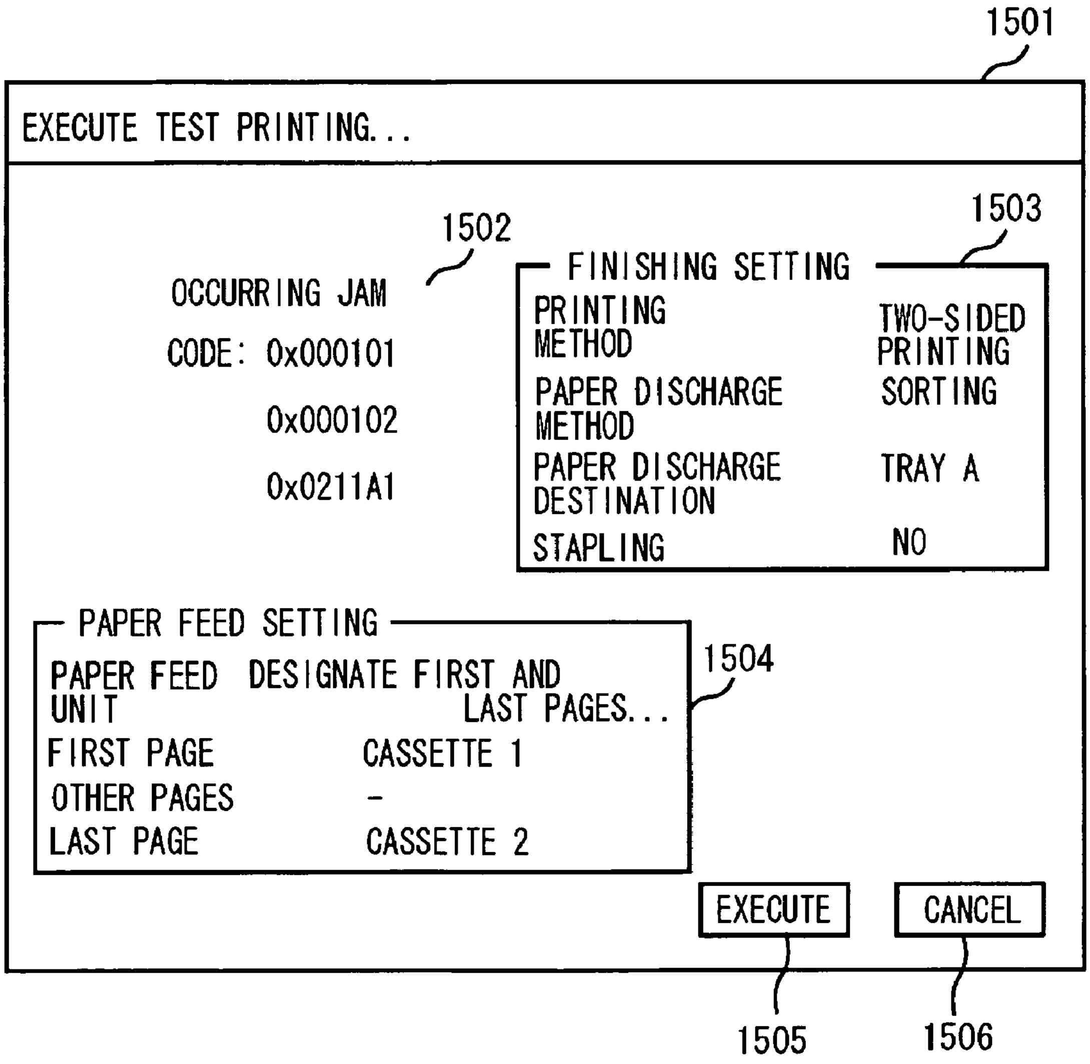
FIG. 15 illustrates an example of a test job execution instruction screen according to the second exemplary embodiment of the present invention.

FIG. 15 illustrates an example of a test job execution instruction screen for executing a test job stored on the storage device 206 according to the present exemplary embodiment.

A test job execution instruction screen 1501 includes a jam code 1502 of the occurring jam, a finishing setting 1503, and a paper feed setting 1504.

When the user presses an execution button 1505, the test job is executed. On the other hand, when the user presses a cancel button 1506, the test job is not executed and the processing ends or the screen returns to a previous screen.

Furthermore, in the present exemplary embodiment, one test job is generated with respect to a plurality of jams that has occurred in the same job. Accordingly, it is also useful if the test job is linked with the date and time in the jam history and stored on the storage device 206. A test job execution instruction screen can be displayed if the test job is linked with the jam occurrence date and time in the jam history and stored on the storage device 206. The test job execution instruction screen can include a jam history number, jam occurrence date and time, a jam code of the occurring jam, and an execution button for executing test printing.

The screens for allowing the user to input an instruction for executing a test job are as described above. However, it is also useful if a last test job is executed via the jam history display screen 1121. Furthermore, it is also useful if a setting verification screen such as the jam history display screen 1121 is displayed after the user has pressed the execution button 1505 on the test job execution instruction screen 1501.

Note that it is not always necessary that the image forming apparatus 101 includes the job generation unit 405 in the above-described first and the second exemplary embodiments. That is, the job generation unit 405 can be provided in any other apparatuses such as an image forming apparatus management server.

Furthermore, in the first and the second exemplary embodiments, the jam code, the jam occurrence date and time, and the attribute information of the jam-occurring job ("paper size", "paper feed port", "two-sided/one-sided", "finishing/paper discharge method", "paper discharge destination", and "stapling") are acquired if a jam has occurred. However, the present invention is not limited to this. That is, it is also useful if all print setting information that can be set on the image forming apparatus 101 is acquired. Furthermore, in the present exemplary embodiment, the jam occurrence date and time, the jam code, and the test job print setting are stored as the information for the test job. However, various other print settings can also be stored as the information for the test job.

With the above-described configuration, if a plurality of jams has occurred in the same job, the present exemplary embodiment can generate a test job in which the recording sheet(s) can be fed from and conveyed through all of the jam locations. Accordingly, the present exemplary embodiment enables a service engineer to execute simulate a plurality of jams occurring in the same job and to verify whether the jams have been solved by executing one test job.

In the first and the second exemplary embodiments, a test job in which the recording sheet is fed from or conveyed through the location of the jam to simulate and verify the restoration from the jam. However, a location at which the cause of a jam has occurred may not always match the location at which the jam has actually occurred. More specifically, if a recording sheet is wrinkled or shrunk at a certain location, a jam may occur at a subsequent location. Accordingly, it is not always effective in solving the jam to execute a test job in which the recording sheet is conveyed through jam occurrence locations.

In this regard, in a third exemplary embodiment, an operation will be described which is executed for generating a test job in which a component consumption rate, which is one of the causes of a wrinkled or shrunk recording sheet, is referred to, the recording sheet is fed from or conveyed through jam occurrence locations, and the parameter "job setting value" is set for components whose consumption rate is high.

In the third exemplary embodiment, an image forming apparatus management system capable of remotely managing the operation state of the image forming apparatus 101 will be described. In the system like this, the management server stores operation information (an error notification, a counter value, or a part counter) about the image forming apparatus 101. Furthermore, the management server can calculate the consumption rate of components of the image forming apparatus 101 according to the part counter of the components of the image forming apparatus 101 and the recommended life of the component.

Figure 16:
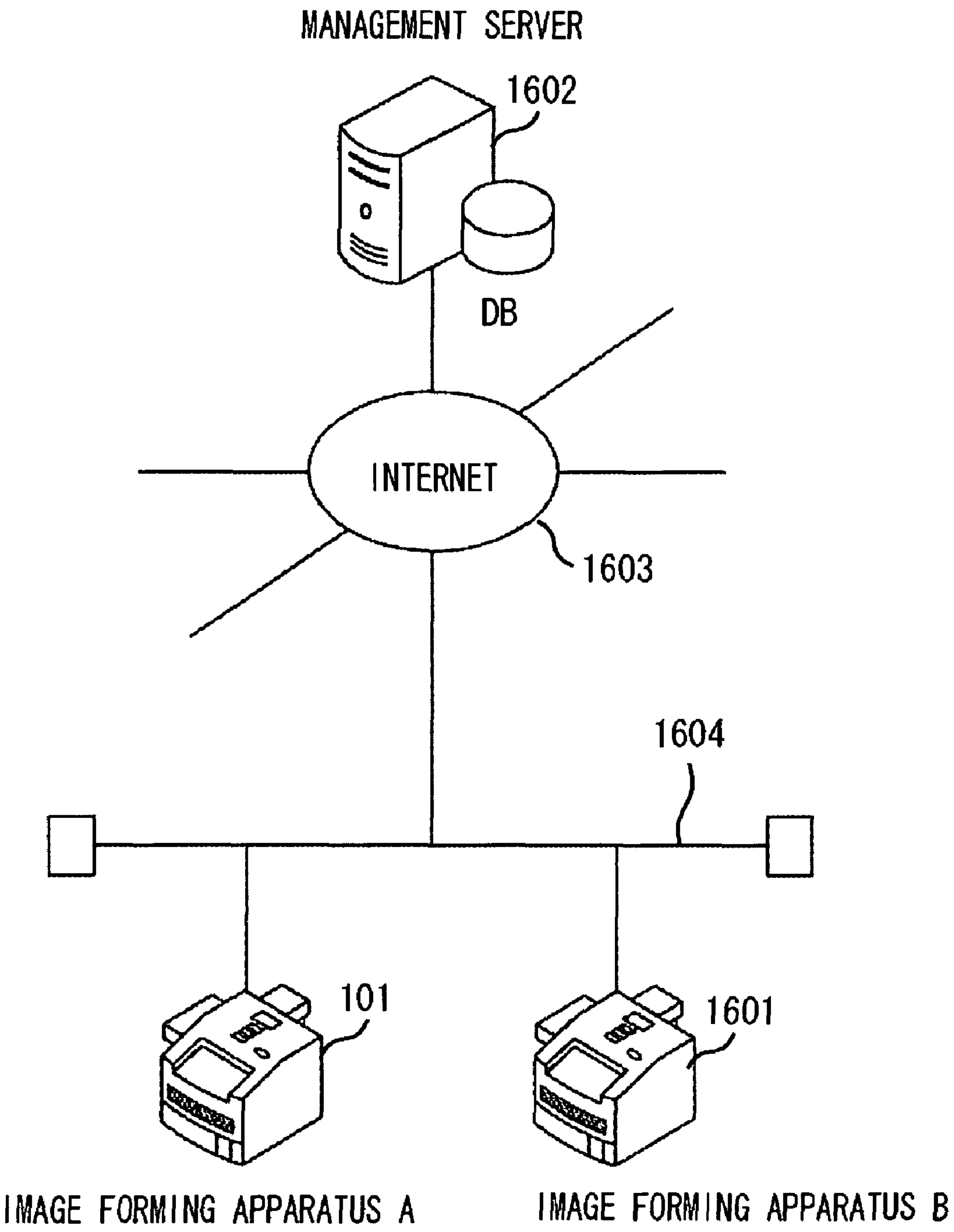
FIG. 16 illustrates a state of connection between the image forming apparatus and a management server via the Internet according to an exemplary embodiment of the present invention.

In FIG. 16, the image forming apparatuses 101 and 1601 are installed within a network used by a customer. A management server 1602 manages the image forming apparatuses 101 and 1601 installed on a network 1604. The management server 1602 executes data communication with the image forming apparatuses 101 an 1601 installed on the network 1604 and another plurality of image forming apparatuses (not illustrated). The management server 1602 manages information received from the image forming apparatus.

Here, the image forming apparatuses 101 and 1601 are connected to the same network (LAN) 1604. However, the present exemplary embodiment is not limited to this. That is, it is also useful if the image forming apparatuses 101 and 1601 exist on any other network (external LAN) connected to the management server 1602 via the Internet 1603.

Figure 17:
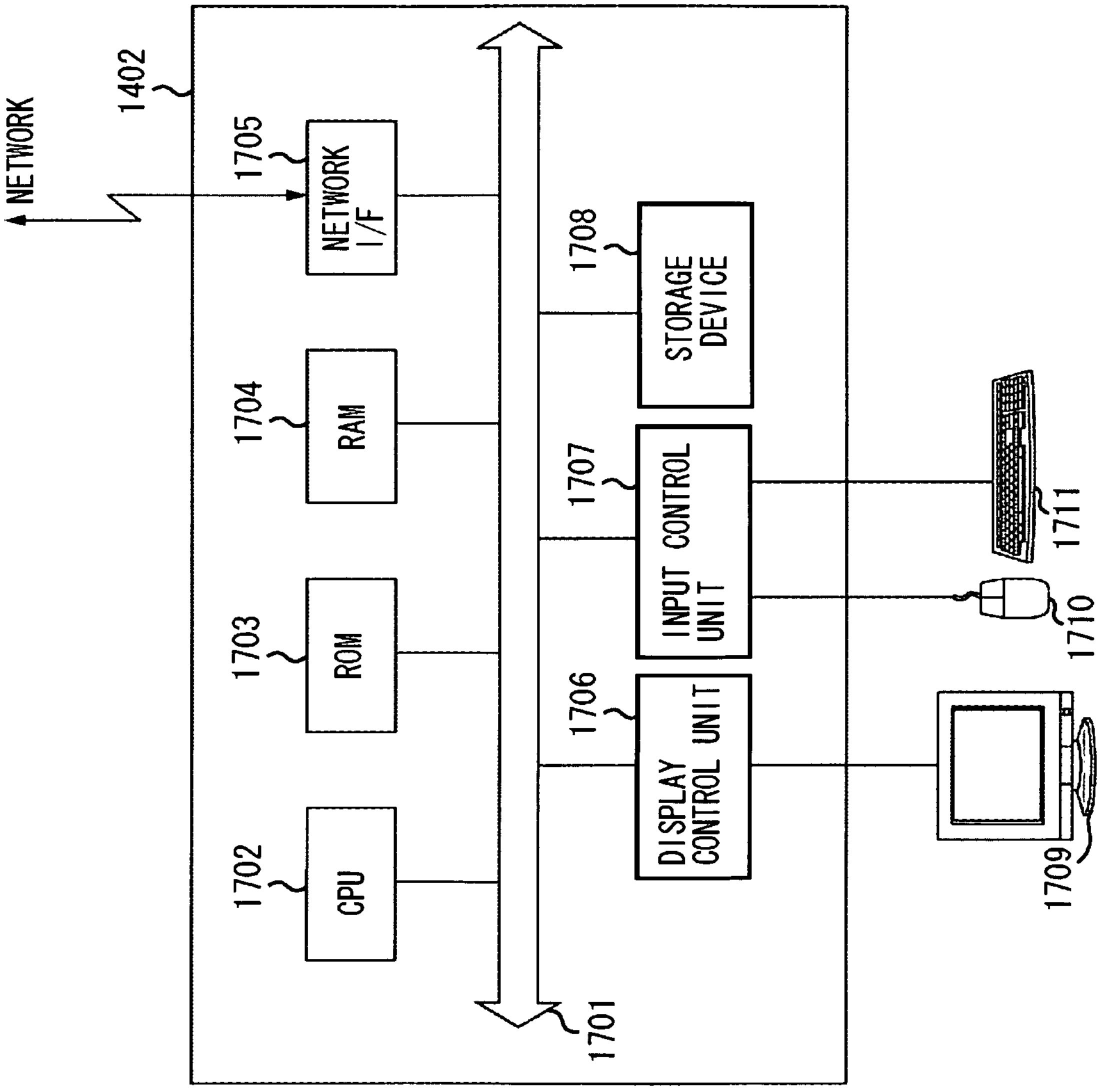
FIG. 17 illustrates an exemplary hardware configuration of a management server according to a third exemplary embodiment of the present invention.

FIG. 17 illustrates an exemplary hardware configuration of the management server 1602.

The management server 1602 can be constituted by a general-purpose computer. The management server 1602 includes a CPU 1702, a ROM 1703, and a RAM 1704. The CPU 1702 controls the operation of the entire the management server 1602. The ROM 1703 is a read-only memory for storing a boot program necessary for booting the system. The RAM 1704 is a work memory used for executing the program with the CPU 1702. In addition, the management server 1602 includes a network I/F 1705, a display control unit 1706, an input control unit 1707, and a storage device 1708. The network I/F 1705 implements a function for executing a data communication via the network. The storage device 1708 stores the program executed by the CPU 1702 and operation information of the image forming apparatus.

The above-described components are in communication with one another via a system bus 1701. A display device 1709 is connected to the display control unit 1706. Input devices 1710 and 1711 are connected to the input control unit 1707. The operator who manages the management server 1602 verifies the operation state of the management server 1602 and issues an instruction for executing an operation thereof via the above-described input and output devices.

Here, the information about the image forming apparatus managed by the management server 1602 includes an identifier (hereinafter simply referred to as an "ID") for uniquely identifying the image forming apparatus and information associated with the ID and managed by the management server 1602. The information associated with the identifying and managed by the management server 1602 includes image forming apparatus basic information, such as the type of the firmware of the image forming apparatus or the type of the image forming apparatus, information about an error, an alarm, or a jam, and a consumption rate of each component. The management server 1602 stores the ID and various information about the image forming apparatus associated with each other on the storage device 1708 and manages the stored information. Furthermore, the management server 1602 stores an image forming apparatus ID management table (not illustrated), which stores a list of image forming apparatus IDs of the image forming apparatuses managed by the management server 1602.

Furthermore, information indicating an abnormal state of the image forming apparatus managed thereby includes information about a jam in addition to the operation information about the image forming apparatus. If the management server 1602 has received the above-described information, the management server 1602 stores the received information on the storage device 1708. If a jam has occurred exceeding a predetermined condition (not described in detail here), the management server 1602 displays a message indicating that the jam has frequently occurred on the display device 1709 to notify the state to the operator. The operator recognizes and verifies the state of the image forming apparatus by referring to the content of the message displayed on the display device 1709 and instructs a service engineer to execute a maintenance operation if necessary.

Figure 18:
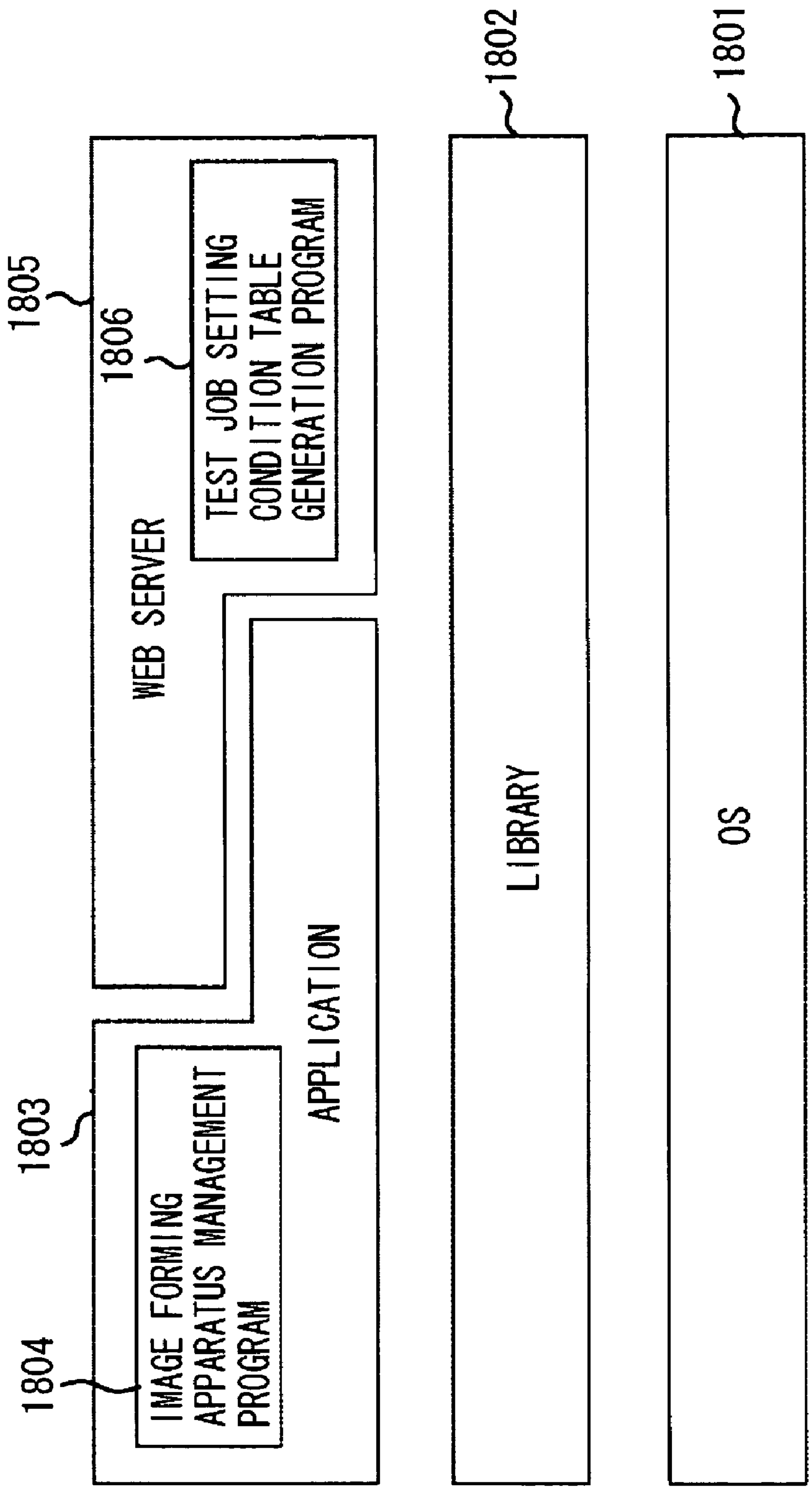
FIG. 18 illustrates an exemplary software configuration of the management server according to the third exemplary embodiment of the present invention.

FIG. 18 illustrates an exemplary software configuration of the management server 1602 according to the third exemplary embodiment of the present invention. In booting the system, the CPU 1702 reads a system boot program from the ROM 1703 to start the operation. Furthermore, the CPU 1702 reads and executes each program from the storage device 1708 on the RAM 1704.

Referring to FIG. 18, the storage device 1708 stores an OS 1801, a library 1802, an application 1803, and an image forming apparatus management program 1804. The application includes the image forming apparatus management program 1804 as a part thereof. The image forming apparatus management program 1804 is a program for managing the image forming apparatuses 101 and 1601 provided on the Internet 1403.

A web server 1805 transmits and receives a message to and from the image forming apparatus 101 via the Internet 1403. A print setting correspondence table generation program 1806 is installed on the web server 1805. The print setting correspondence table generation program 1806 refers to the jam information received from the image forming apparatus 101 and the component consumption rate of the image forming apparatus 101 stored on the storage device 1708 and generates a test job setting correspondence table based on the component consumption rate.

In the main components of the image forming apparatus 101 illustrated in FIG. 2, the control program of the image forming apparatus and the test job generation program 305 for generating a test job corresponding to the jam code are stored on the ROM 204. In the present exemplary embodiment, in addition to storing the above-described programs, an image forming apparatus monitoring program (not illustrated) is stored on the ROM 204.

In the present exemplary embodiment, the image forming apparatus monitoring program is installed on the image forming apparatus. However, it is also useful if the image forming apparatus monitoring program is installed on a monitoring apparatus different from the image forming apparatus capable of acquiring information from the image forming apparatus via the network.

Furthermore, the image forming apparatus monitoring program executed by the CPU 207 reads the counter value, the operation information such as the operation log, and error information, such as jam information, stored on the storage device 206. In addition, the image forming apparatus monitoring program transmits the read information to the management server 1602 via the network I/F 202 as image forming apparatus status information.

In addition to the software configuration of the image forming apparatus 101 illustrated in FIG. 3, the present exemplary embodiment includes a web server (not illustrated) and an image forming apparatus monitoring program (not illustrated) as a part of the application 304. The web server transmits and receives a message to and from the management server 1602 via the Internet 1403.

The image forming apparatus monitoring program acquires various information about the image forming apparatus via the controller 302. The image forming apparatus monitoring program periodically acquires the firmware type, the number of prints, and information about the component consumption rate and transmits the received information to the management server 1602. If an error, an alarm, a jam, or an abnormal state, such as "almost no toner" and "door-open", has occurred and detected, the image forming apparatus monitoring program transmits the information about the detected state to the management server 1602. Note here that the information transmitted by the image forming apparatus monitoring program periodically or on the occurrence basis is not limited to the above-described information.

Figure 19:
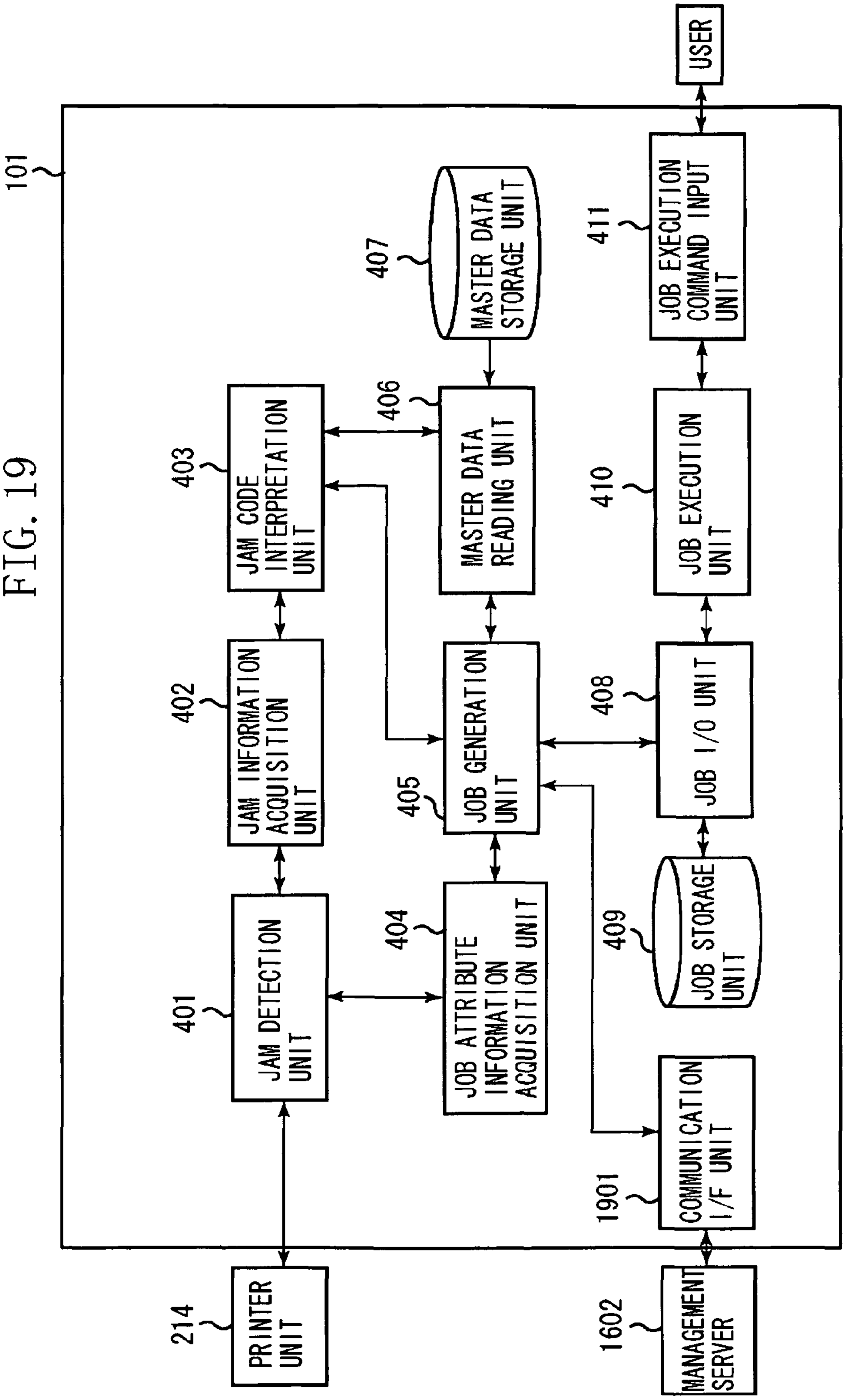
FIG. 19 illustrates an exemplary functional configuration of an image forming apparatus according to the third exemplary embodiment of the present invention.

FIG. 19 illustrates an exemplary function of the image forming apparatus 101 related to the test job generation program 305 according to the third embodiment of the present invention. Hereinbelow, only the functions of the image forming apparatus 101 according to the present exemplary embodiment different from those of the image forming apparatus 101 (FIG. 2) according to the first exemplary embodiment will be described in detail.

A communication I/F unit 1901 transmits and receives a message to and from the management server 1602 via the network I/F 202.

The job generation unit 405 requests the communication I/F unit 1901 to transmit the acquired jam code and the job attribute information to the management server 1602. Furthermore, the communication I/F unit 1901 receives a test job setting dependency correspondence table from the management server 1602. A test job is generated based on the test job setting dependency correspondence table received in the above-described manner and the print setting condition table stored on the master data storage unit 407.

FIG. 20 illustrates an example of data to be transmitted by the test job generation program 305 to the management server 1602 if a jam has occurred on the image forming apparatus 101. The management server 1602 receives the data via the network I/F 1705.

Note that in FIG. 20, only the data related to the present exemplary embodiment is illustrated. Hypertext Transport Protocol (HTTP) is used in transmitting a message.

Data to be transmitted 2001, which indicates the entire data, includes information (an ID, for example) 2002 for identifying the image forming apparatus 101, jam occurrence date and time 2003, a total counter 2004, which is acquired via the controller 302 if a jam has occurred, and a jam code 2005.

It can be known here by referring to the jam code list 501 (FIG. 5) that the jam (0x010107) that has occurred is a fixing unit paper discharge delay jam.

Furthermore, setting information, such as "paper size" 2006, "paper feed port" 2007, "two-sided/one-sided" 2008, "finishing/paper discharge method" 2009, "paper discharge destination" 2010, and "stapling" 2011, is stored as the attribute information of the jam-occurring job.

FIG. 21 illustrates an example of a setting-concerned component correspondence table stored on the storage device 1708 of the management server 1602 according to the third embodiment.

A setting-concerned component correspondence table 2101 stores a main body segment 2102 of the image forming apparatus 101, a value 2103 of the print setting related to each main body segment 2102, a component name 2104 of a component used with each print setting 2103, and a position marker 2105 which indicates the location of each component.

The component used in the paper feed unit of the main body segment 2102 differs according to the value of the setting 2103, for example. The parameter "job setting value" is set for the components such as a "paper feed and conveyance roller 1" (not illustrated) and a "registration roller" (not illustrated) regardless of the setting of the paper feed unit when the parameter "set for all " is set for the setting 2103. The parameter "job setting value" is set for the components such as the "paper feed and conveyance roller 1", the "registration roller", a "cassette 114 paper feed roller", and a "cassette 114 conveyance roller", each of which is not illustrated herein, if the parameter "cassette 114" is set as the setting of the paper feed unit when the parameters "set for all" and "cassette 114" are set for the setting 2103.

As described above, by referring to the setting-concerned component correspondence table 2101, the operator can recognize the concerned (used) components based on the setting information for the jam-occurring job stored therein.

FIG. 22 illustrates an example of a list of results of referring to a component consumption rate, which is obtained by the test job setting condition table generation program 1806 installed on the management server 1602. The table is stored on the RAM 1704 of the management server 1602.

The print setting correspondence table generation program 1806 refers to the component consumption rate of the components used during the time from the feeding of the recording sheet to the occurrence of the jam. The test job setting condition table generation program 1806 generates a list of components whose consumption rate is to be referred to based on the data 2001 received from the image forming apparatus 101 and the setting-concerned component correspondence table 2101.

A component consumption rate reference result list 2201 includes a main body segment 2202 of the image forming apparatus 101, a setting 2203 in the received data 2001 related to each main body segment 2202, a name of the component to be used 2204, a position marker 2205 indicating the location of each component, and a component consumption rate 2206.

If it is detected that a component whose consumption rate exceeds a threshold value exists, a setting value with which the component is used is set as the print setting for the test job. Accordingly, if the component is used only when a specific setting value is set, the present exemplary embodiment sets the same print setting for the test job as that of the jam-occurring job.

As described above, the print setting correspondence table generation program 1806 determines which of the parameters "default" and "job setting value" (of a jam-occurring job) is to be set for each print setting of a test job based on the component consumption rate. Furthermore, the present exemplary embodiment transmits the result of the determination to the image forming apparatus 101. Accordingly, the present exemplary embodiment can generate a test job having a setting value of the print setting related to the jam-occurring component whose component consumption rate is high.

Note that in the present exemplary embodiment, the threshold value of the component consumption rate is 85%.

FIG. 23 illustrates an example of data that the image forming apparatus 101 receives from the management server 1602 according to the third exemplary embodiment of the present invention. The image forming apparatus 101 receives data via the network I/F 202 and stores the received data on the RAM 205.

Received data 2301 includes information (an ID, for example) 2302 for uniquely identifying the image forming apparatus 101, jam occurrence date and time 2303, a jam code 2304, and a print setting correspondence table 2305. Setting values for setting items, such as "paper feed port" 2306, "two-sided/one-sided" 2307, "finishing/paper discharge method" 2308, "paper discharge destination" 2309, and "stapling" 2110, are stored as the print setting values.

Figure 24:
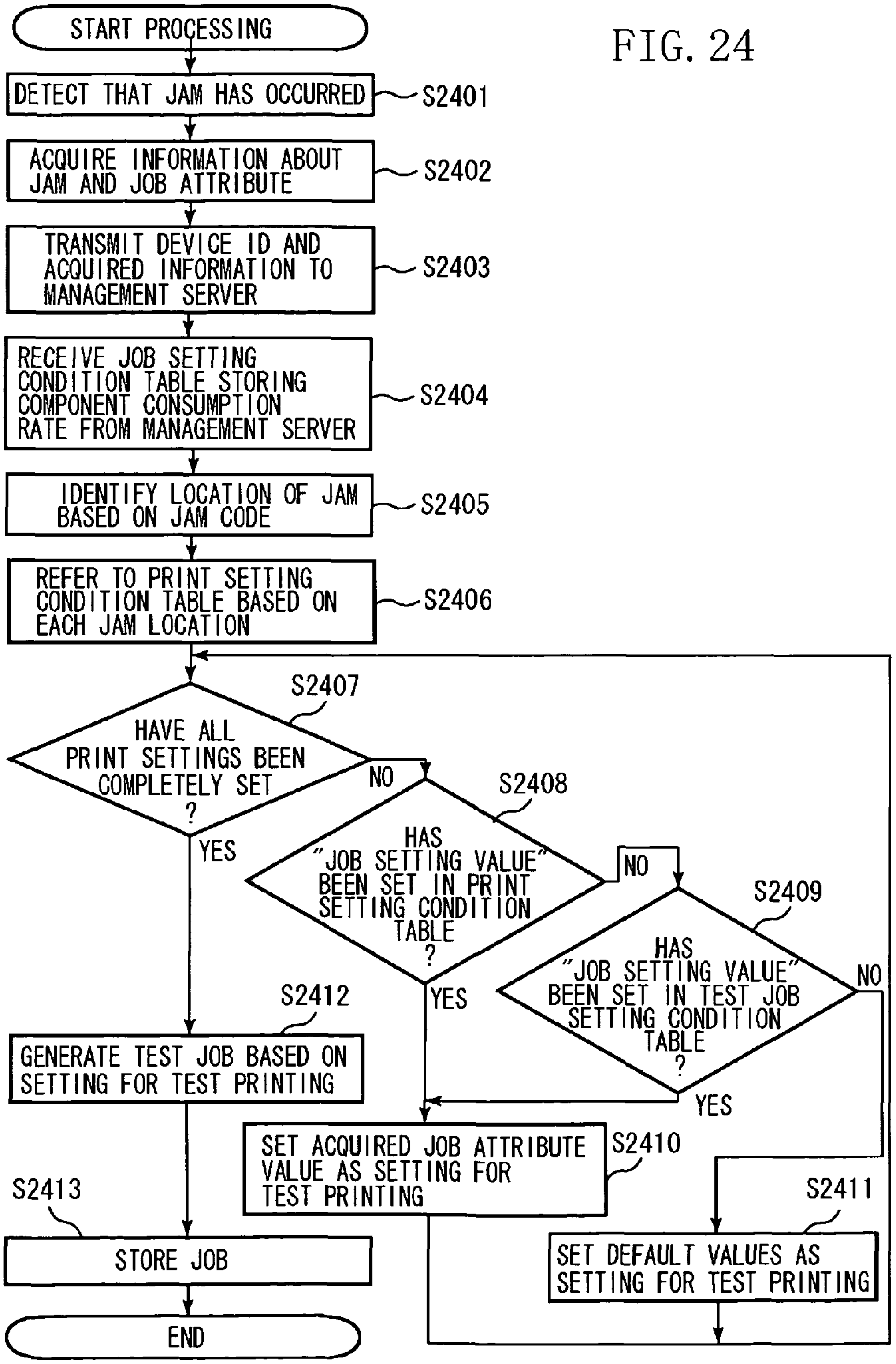
FIG. 24 is a flow chart illustrating an exemplary flow of processing executed by the image forming apparatus according to the third exemplary embodiment of the present invention.

FIG. 24 is a flow chart illustrating an exemplary flow of processing executed by the image forming apparatus 101 by executing a program therefor according to the third exemplary embodiment of the present invention.

Referring to FIG. 24, in step S2401, the jam detection unit 401, if a jam has occurred, detects the jam with the jam detection unit 401.

In step S2402, the jam information acquisition unit 402 and the job attribute information acquisition unit 404 acquire the jam code and the job attribute information from the storage device 206 and stores the acquired jam code and information on the RAM 205.

In step S2403, the jam information acquisition unit 402 and the job attribute information acquisition unit 404 acquire the jam code and the job attribute information stored on the RAM 205 of the image forming apparatus 101, adds the ID of the image forming apparatus 101 thereto, and generates data 2001 to be transmitted to the management server 1602. The generated data to be transmitted 2001 is stored on the RAM 205. The data to be transmitted 2001 stored on the RAM 205 is then transmitted to the management server 1602 via the network I/F 202.

In step S2404, the communication I/F unit 1901 receives the data 2301 from the management server 1602 via the network I/F 202 and stores the received data 2301 on the RAM 205. The communication I/F unit 1901 acquires the device ID 2302, the jam occurrence date and time 2303, and the jam code 2304 from the received data 2301 stored on the RAM 205 and verifies that the received data 2301 is received data related to the jam for which the test job is generated.

In step S2405, the jam code interpretation unit 403 identifies the location of the jam based on the jam code stored on the RAM 205. The jam that has occurred in the present exemplary embodiment is a fixing unit paper discharge delay jam (0x010107).

In step S2406, the job generation unit 405 compares the value in the print setting condition tables 601, 611, and 621 and the value in the print setting correspondence table 2305 regarding each print setting item of the test job. In step S2407, the job generation unit 405 determines whether the comparison of all of the print settings has been completed. If it is determined in step S2407 that the comparison of all of the print settings has been completed (YES in step S2407), then the processing advances to step S2412. On the other hand, if it is determined in step S2407 that the comparison has not been completed yet (NO in step S2407), then the processing advances to step S2408.

In step S2408, the job generation unit 405 refers to the print setting condition tables 601, 602, and 603 and determines whether the parameter "job setting value" has been set in the print setting condition table as the corresponding print setting. If it is determined in step S2408 that the parameter "default" has been set in the print setting condition table as the corresponding print setting (NO in step S2408), then the processing advances to step S2409. On the other hand, if it is determined in step S2408 that the parameter "job setting value" has been set in the print setting condition table as the corresponding print setting (YES in step S2408), then the processing advances to step S2410. In the present exemplary embodiment, the setting for the paper feed port has the parameter "default" by referring to the print setting condition table 611. Accordingly, the processing advances to step S2409.

In step S2409, the job generation unit 405 acquires the print setting correspondence table 2305 from the received data 2301 stored on the RAM 205 and refers to the corresponding print setting. Furthermore, the job generation unit 405 determines whether the parameter "job setting value" has been set in the test job setting condition table as the corresponding print setting. If it is determined in step S2409 that the parameter "default" has been set in the test job setting condition table as the corresponding print setting (NO in step S2409), then the processing advances to step S2411. On the other hand, if it is determined in step S2409 that the parameter "job setting value" has been set in the test job setting condition table as the corresponding print setting (YES in step S2409), then the processing advances to step S2410. Here, by referring to the print setting correspondence table 2305, it can be known that the parameter "job setting value" has been set for the paper feed port. Accordingly, the processing advances to step S2410.

In step S2410, the job generation unit 405 acquires each print setting from the jam-occurring job attribute information stored on the RAM 205 and stores the acquired print setting on the RAM 205 as the print setting of the test job.

In step S2411, the job generation unit 405 sets the parameter "default" as the print setting of the test job and stores the setting value on the RAM 205.

In step S2412, the job generation unit 405 generates a test job based on the print setting of the test job stored on the RAM 205.

In step S2413, the test job generated in step S2412 is stored on the storage device 206 via the job I/O unit 408.

Figure 25:
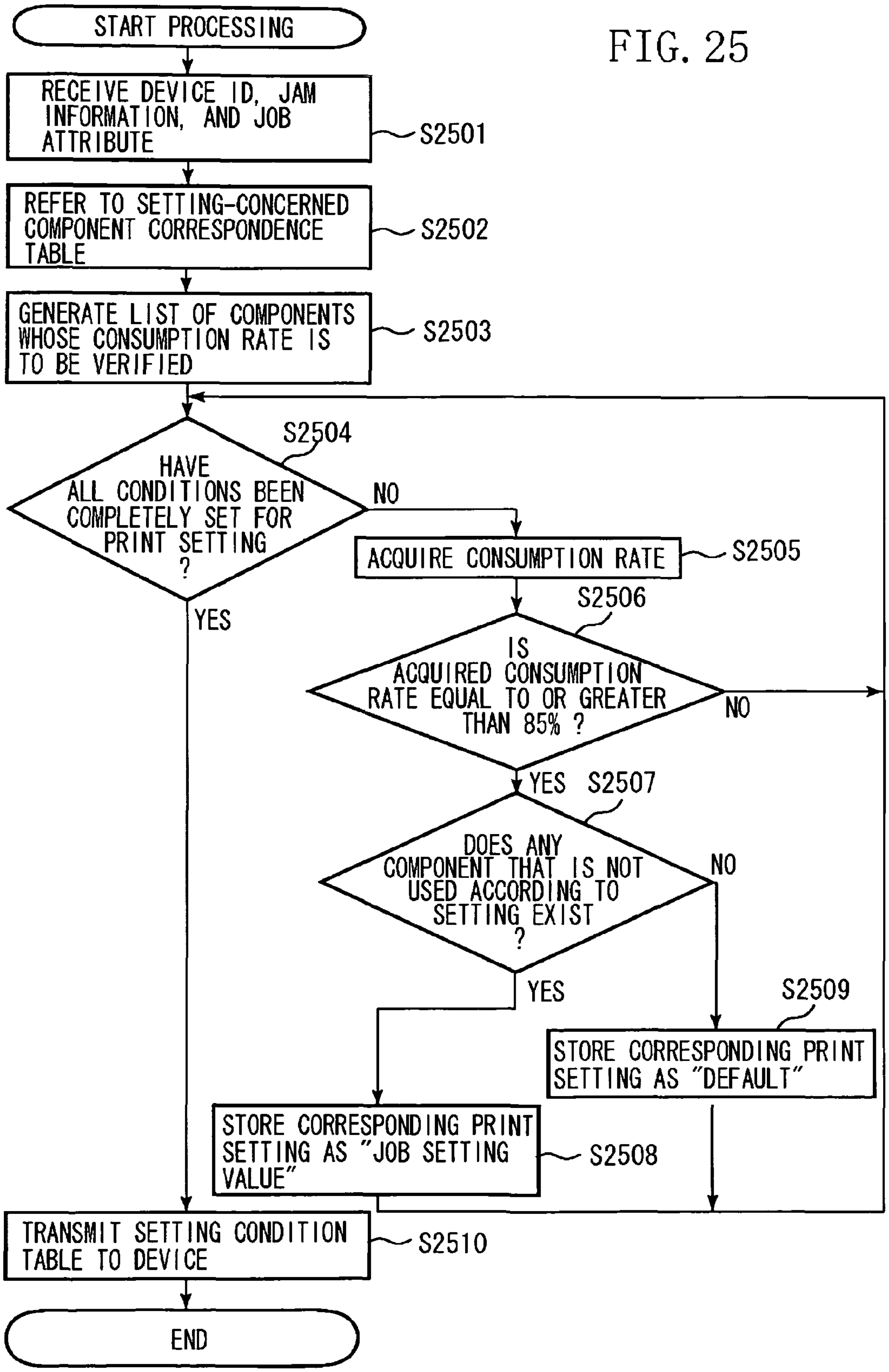
FIG. 25 is a flow chart illustrating an exemplary flow of processing executed by the management server according to the third exemplary embodiment of the present invention.

FIG. 25 is a flow chart illustrating an exemplary flow of processing performed by executing a corresponding program with the CPU of the management server 1602 according to the third exemplary embodiment of the present invention.

Referring to FIG. 25, in step S2501, the management server 1602 receives the data 2002 from the image forming apparatus 101 via the network I/F 1705 and stores the received transmission data 2001 on the RAM 1704.

In step S2502, the management server 1602 acquires the setting-concerned component correspondence table 2101 stored on the storage device 1708. Furthermore, the management server 1602 acquires a jam code and print settings from the RAM 1704.

In step S2503, the management server 1602 generates a component consumption rate reference result list 2201 based on the information acquired in step S2502 and stores the generated list on the RAM 1704. At this time, the value of the consumption rate 2206 is yet to be stored.

In step S2504, the management server 1602 generates a print setting correspondence table storing information about which of the parameters "default" and "job setting value" is to be set for each print setting. After completely setting the parameter for all of the print settings (YES in step S2504), the processing advances to step S2510.

In step S2505, the management server 1602 acquires the consumption rate of the corresponding component from the storage device 1708 and stores the acquired component consumption rate on the RAM 1704.

In step S2506, the management server 1602 determines whether the component consumption rate acquired in step S2505 is equal to or higher than 85%. If it is determined in step S2506 that the component consumption rate acquired in step S2505 is equal to or higher than 85% (YES in step S2506), then the processing advances to step S2507. On the other hand, if it is determined in step S2506 that the component consumption rate acquired in step S2505 is less than 85% (NO in step S2506), then the processing returns to step S2504.

In step S2507, the management server 1602 determines whether a component that is not used according to the print setting is included in the components whose consumption rate is equal to or higher than 85%. If it is determined in step S2507 that all the components whose consumption rate is equal to or higher than 85% are used regardless of the print setting (NO in step S2507), then the processing advances to step S2509. On the other hand, if it is determined in step S2507 that a component that is not used according to the print setting is included in the components whose consumption rate is equal to or higher than 85% (YES in step S2507), then the processing advances to step S2508.

In step S2508, the management server 1602 sets the parameter "job setting value" for the corresponding print setting stored in the print setting correspondence table and stores the setting value on the RAM 1704.

In step S2509, the management server 1602 sets the parameter "default" for the corresponding print setting stored in the print setting correspondence table and stores the setting value on the RAM 1704.

In step S2510, the management server 1602 generates data 2301 based on the print setting correspondence table stored on the RAM 1704 and transmits the generated data to the image forming apparatus 101 via the network I/F 1705.

FIG. 26 illustrates an example of information for a test job stored on the storage device 206 in step S2413 according to the third exemplary embodiment of the present invention.

Referring to FIG. 26, information for test job 2601 includes date and time 2602 of the jam corresponding to the test job and a jam code 2603. In the present exemplary embodiment, it is supposed that three jams have occurred. Accordingly, the test job information 2601 includes information about the three jams. In addition, the information for test job 2601 includes a print setting 2604 of the test job.

Figure 27:
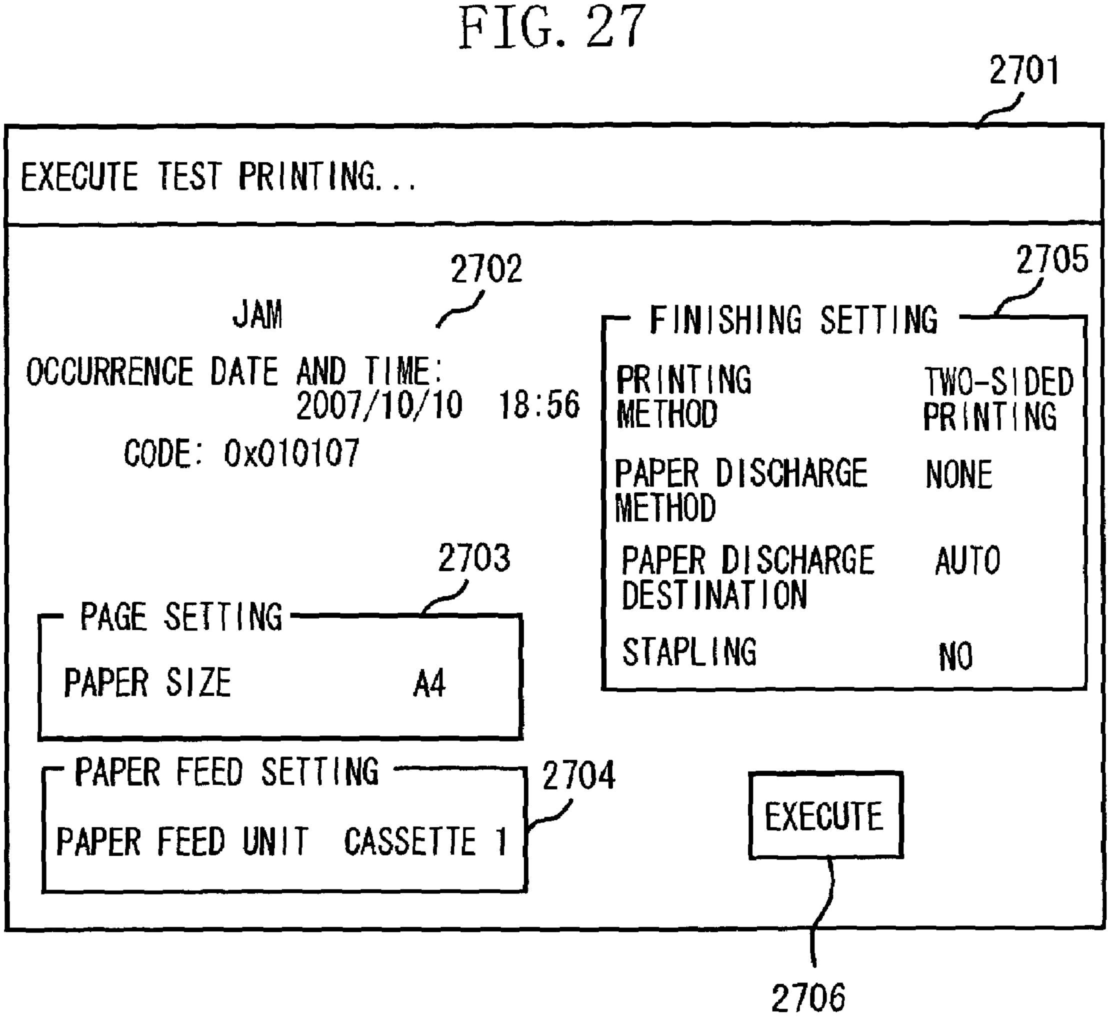
FIG. 27 illustrates an example of a test job execution instruction screen according to the third exemplary embodiment of the present invention.

FIG. 27 illustrates an example of a test job execution instruction screen according to the third exemplary embodiment of the present invention.

Referring to FIG. 27, a test job execution instruction screen 2701 includes a field 2702 including jam information, such as jam occurrence date and time and a jam code, a page setting for test job 2703, a test job paper feed setting 2704, a test job finishing setting 2705, and an execution button 2706.

When the user presses the execution button 2706, the image forming apparatus 101 executes the test job.

The test job execution instruction screen is not limited to the screen 2701. More specifically, it is also useful if the test job execution instruction screens illustrated in FIG. 10, FIGS. 11A through 11C, and FIG. 15 are displayed to receive an input from the user and execute the input job.

In the first and the second exemplary embodiments, the image forming apparatus includes the job generation unit 405. However, the present invention is not limited to this. That is, it is also useful if the job generation unit 405 is provided in a different another apparatus (the management server 1602, for example).

Furthermore, in the present exemplary embodiment, the threshold value of the component consumption rate is 85%. However, the present invention is not limited to this. That is, an arbitrarily designated value can be used if the arbitrarily designated value can implement the effect of the present invention. Furthermore, the threshold value can be input by the user.

With the above-described configuration, the present exemplary embodiment can generate a test job in which the jam-occurring components whose consumption rate has become high are used. Accordingly, the present exemplary embodiment can allow a service engineer to readily execute a jam resolution verification test, which may be executed after replacing a component whose consumption rate has become high.

The present invention can also be applied to a system including a plurality of devices and to an apparatus that includes one device. More specifically, the present invention can be applied to a printer, a facsimile apparatus, a PC, or a computer system including a server and a client.

Note that the present invention can be implemented by directly or remotely supplying a program of software implementing functions of the above-described exemplary embodiments (in the exemplary embodiments, the program corresponding to the processing executed according to the flow charts in the drawings) to a system or an apparatus and reading and executing supplied program code with the system or a computer of the apparatus.

Accordingly, the program code itself, which is installed to an information processing apparatus for implementing the functional processing of the present invention with the computer, implements the present invention. That is, the present invention also includes the computer program implementing the functional processing of the present invention.

Accordingly, the program can be configured in any form, such as object code, a program executed by an interpreter, and script data supplied to an OS.

As the recording medium for supplying such program code, a floppy disk, a hard disk, an optical disk, a magneto-optical disk (MO), a compact disc-read only memory (CD-ROM), a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk. The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-052088 filed Mar. 3, 2008, which is hereby incorporated by reference herein in its entirety.

What is claimed is:

1. An image forming apparatus comprising:

a storage unit configured to store attribute information about a job executed on the image forming apparatus;

a detection unit configured to detect a jam that has occurred on the image forming apparatus; and a generation unit configured to generate a test job in which a print setting is set based on a type of the jam detected by the detection unit and the job attribute information corresponding to the jam and stored on the storage unit, wherein the image forming apparatus is connected via a network with a management server that stores operation information about the image forming apparatus and manages a consumption rate of a component constituting the image forming apparatus, and wherein the generation unit generates a test job including a print setting set based on information acquired from the management server based on the consumption rate of the component related to the type of the jam detected by the detection unit and the attribute information of the job corresponding to the jam.

2. The image forming apparatus according to claim 1, wherein the generation unit generates the test job in which a sheet is conveyed through a location at which the jam has occurred.

3. The image forming apparatus according to claim 1, wherein, if jams have been detected by the detection unit at a plurality of locations in the image forming apparatus, the generation unit generates a test job in which a print setting based on each type of the jams detected at the plurality of locations in the image forming apparatus and the attribute information of the job corresponding to each of the jams detected at the plurality of locations in the image forming apparatus is set.

4. The image forming apparatus according to claim 3, wherein the generation unit generates a test job including two different print settings for allowing a sheet to be conveyed through the locations of occurrence of the plurality of jams.

5. The image forming apparatus according to claim 1, wherein the test job includes a job for verifying whether the jam detected by the detection unit has been solved or for simulating the jam.

6. The image forming apparatus according to claim 1, wherein the generation unit generates a test job in which a print setting different from a print setting described in the attribute information about the job stored on the storage unit and corresponding to the jam that has been detected by the detection unit is set.

7. An information processing method comprising:

storing attribute information about a job executed on an image forming apparatus;

detecting a jam that has occurred on the image forming apparatus;

generating a test job in which a print setting is set based on a type of the detected jam and the stored job attribute information corresponding to the jam, wherein the image forming apparatus is connected via a network with a management server that stores operation information about the image forming apparatus and manages a consumption rate of a component constituting the image forming apparatus; and generating a test job including a print setting set based on information acquired from the management server based on the consumption rate of the component related to the type of the detected jam and the attribute information of the job corresponding to the jam.

8. The information processing method according to claim 7, further comprising generating the test job in which a sheet is conveyed through a location at which the jam has occurred.

9. The information processing method according to claim 7, further comprising generating, if jams have been detected at a plurality of locations in the image forming apparatus, a test job in which a print setting based on each type of the jams detected at the plurality of locations in the image forming apparatus and the attribute information of the job corresponding to each of the jams detected at the plurality of locations in the image forming apparatus is set.

10. The information processing method according to claim 9, further comprising generating a test job including two different print settings for allowing a sheet to be conveyed through the locations of occurrence of the plurality of jams.

11. A non-transitory computer-readable medium storing instructions which, when executed by a computer, cause the computer to execute the information processing method according to claim 7.

12. An image forming apparatus including a display unit, the image forming apparatus comprising:

a detection unit configured to detect a jam that has occurred on the image forming apparatus;

a list display unit configured to display a list of the jams detected by the detection unit on the display unit; and an instruction screen display unit configured to display a screen for instructing execution of a test job generated based on a type of a plurality of jams designated from among jams included in the list displayed by the list display unit, wherein a type of the plurality of designated jams and a print setting of the test job set based on the type of the plurality of jams are displayed on the instruction screen display unit, and the print setting includes two different print settings for allowing a sheet to be conveyed through the locations of occurrence of the plurality of jams.

13. An information processing method for an image forming apparatus including a display unit, the information processing method comprising:

detecting a jam that has occurred on the image forming apparatus;

displaying a list of the detected jams on the display unit; and displaying a screen for instructing execution of a test job generated based on a type of a plurality of jams designated from among jams included in the displayed list, wherein a type of the plurality of designated jams and a print setting of the test job set based on the type of the plurality of jams are displayed on the screen, and the print setting includes two different print settings for allowing a sheet to be conveyed through the locations of occurrence of the plurality of jams.

14. A non-transitory computer-readable medium storing instructions which, when executed by a computer, cause the computer to execute the information processing method according to claim 13.

* * * * *